United States Patent [19]

McFarland, Jr.

(10) Patent No.: US 11,527,154 B2
(45) Date of Patent: Dec. 13, 2022

(54) WRONG WAY DRIVING PREVENTION

(71) Applicant: TOYOTA MOTOR NORTH AMERICA, INC., Plano, TX (US)

(72) Inventor: Stephen Paul McFarland, Jr., Allen, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 111 days.

(21) Appl. No.: 16/796,939

(22) Filed: Feb. 20, 2020

(65) Prior Publication Data

US 2021/0264778 A1    Aug. 26, 2021

(51) Int. Cl.
| G08G 1/00 | (2006.01) |
| G08G 1/056 | (2006.01) |
| B60W 30/09 | (2012.01) |
| G01C 21/36 | (2006.01) |
| B60W 50/14 | (2020.01) |
| G08G 1/052 | (2006.01) |
| B60Q 1/46 | (2006.01) |
| B60Q 5/00 | (2006.01) |

(52) U.S. Cl.
CPC ............. *G08G 1/056* (2013.01); *B60W 30/09* (2013.01); *B60W 50/14* (2013.01); *G01C 21/3629* (2013.01); *G08G 1/052* (2013.01); *B60Q 1/46* (2013.01); *B60Q 5/005* (2013.01); *B60W 2050/143* (2013.01); *B60W 2050/146* (2013.01); *B60W 2520/06* (2013.01); *B60W 2520/10* (2013.01); *B60W 2552/05* (2020.02); *B60W 2556/45* (2020.02); *B60W 2720/10* (2013.01); *B60W 2720/24* (2013.01)

(58) Field of Classification Search
CPC ....... G08G 1/056; G08G 1/052; B60W 30/09; B60W 50/14; G01C 21/3629
See application file for complete search history.

(56) References Cited

U.S. PATENT DOCUMENTS

| 6,630,892 B1 | 10/2003 | Crockford et al. |
| 7,095,336 B2 | 8/2006 | Rodgers et al. |
| 7,212,901 B2 | 5/2007 | Sadano et al. |
| 7,424,357 B2 | 9/2008 | Ozaki et al. |
| 7,515,056 B2 | 4/2009 | Knoop et al. |
| 7,783,403 B2 | 8/2010 | Breed |
| 8,970,701 B2 | 3/2015 | Lao |
| 9,623,875 B2 | 4/2017 | Beyene et al. |

(Continued)

FOREIGN PATENT DOCUMENTS

| CA | 2596939 A1 | 8/2006 |
| CN | 100381314 C | 4/2008 |

(Continued)

*Primary Examiner* — Peter D Nolan
*Assistant Examiner* — Wae L Louie

(57) ABSTRACT

An example operation includes one or more of initially determining, via one or more sensors on a transport, that the transport is approaching a one-way road in a wrong direction based on a slowing down of the transport and a movement of the transport toward the one-way road, notifying, via the one or more sensors, one or more occupants of the transport about the approaching, and in response to the transport continuing to approach in the wrong direction, slowing the transport, by a computer associated with the transport, to not permit entry into the one-way road.

18 Claims, 22 Drawing Sheets

(56) References Cited

U.S. PATENT DOCUMENTS

| | | | |
|---|---|---|---|
| 9,881,503 B1 | 1/2018 | Goldman-Shenhar et al. | |
| 9,928,735 B2 | 3/2018 | Wang | |
| 9,959,765 B2 | 5/2018 | Thompson et al. | |
| 10,008,110 B1 * | 6/2018 | Herlocker | G08G 1/0129 |
| 10,049,408 B2 | 8/2018 | Carver et al. | |
| 10,114,374 B2 | 10/2018 | Tao et al. | |
| 10,235,877 B1 | 3/2019 | Ellis | |
| 10,253,468 B1 * | 4/2019 | Linville | E01F 9/40 |
| 10,275,788 B2 * | 4/2019 | Wang | G06Q 50/01 |
| 10,300,851 B1 * | 5/2019 | Kim | G06N 3/08 |
| 10,332,396 B1 * | 6/2019 | Christensen | B60W 60/0015 |
| 10,891,694 B1 | 1/2021 | Leise et al. | |
| 11,198,434 B2 | 12/2021 | Elzen et al. | |
| 2002/0188400 A1 * | 12/2002 | Sato | G01C 21/3415 340/995.19 |
| 2005/0128061 A1 | 6/2005 | Yanai | |
| 2007/0088488 A1 | 4/2007 | Reeves et al. | |
| 2007/0293996 A1 | 12/2007 | Mori et al. | |
| 2010/0207751 A1 * | 8/2010 | Follmer | G01C 21/32 340/439 |
| 2010/0256852 A1 | 10/2010 | Mudalige | |
| 2012/0264376 A1 | 10/2012 | Breed | |
| 2012/0296562 A1 | 11/2012 | Carlson et al. | |
| 2012/0299713 A1 | 11/2012 | Elia et al. | |
| 2013/0044009 A1 * | 2/2013 | Tagawa | G01C 21/3697 340/995.28 |
| 2013/0093895 A1 | 4/2013 | Palmer et al. | |
| 2013/0127638 A1 | 5/2013 | Harrison | |
| 2013/0127639 A1 | 5/2013 | Toreh et al. | |
| 2015/0077273 A1 * | 3/2015 | Alshinnawi | G08G 1/0145 340/928 |
| 2016/0148511 A1 | 5/2016 | Shibata et al. | |
| 2016/0379486 A1 | 12/2016 | Taylor | |
| 2017/0011625 A1 | 1/2017 | Stelzig et al. | |
| 2017/0146801 A1 | 5/2017 | Stempora | |
| 2018/0018877 A1 | 1/2018 | Townsend | |
| 2018/0174446 A1 | 6/2018 | Wang | |
| 2018/0273048 A1 * | 9/2018 | Perez Barrera | B60W 50/0098 |
| 2018/0299283 A1 | 10/2018 | Wang et al. | |
| 2018/0349713 A1 | 12/2018 | Jiang et al. | |
| 2018/0362033 A1 | 12/2018 | Newman et al. | |
| 2019/0088148 A1 | 3/2019 | Jacobus et al. | |
| 2019/0130736 A1 * | 5/2019 | Silver | G05D 1/0246 |
| 2019/0220015 A1 | 7/2019 | Phillips et al. | |
| 2019/0266893 A1 * | 8/2019 | Sambo | G08G 1/20 |
| 2020/0017928 A1 | 1/2020 | Morioka et al. | |
| 2020/0062237 A1 | 2/2020 | Ayesh et al. | |
| 2020/0117928 A1 | 4/2020 | Nishimura | |
| 2020/0262444 A1 | 8/2020 | Kong et al. | |
| 2020/0409352 A1 | 12/2020 | Caldwell et al. | |
| 2021/0075670 A1 | 3/2021 | Mezaael | |
| 2021/0163042 A1 | 6/2021 | Klashorst et al. | |
| 2021/0174671 A1 * | 6/2021 | Borras | H04W 4/021 |
| 2021/0231458 A1 * | 7/2021 | Millington | G08G 1/096791 |
| 2021/0264778 A1 * | 8/2021 | McFarland, Jr. | B60Q 1/50 |

FOREIGN PATENT DOCUMENTS

| | | |
|---|---|---|
| CN | 101508246 A | 8/2009 |
| CN | 1907750 B | 6/2011 |
| CN | 202472943 U | 10/2012 |
| CN | 102941853 A | 2/2013 |
| CN | 104471624 A | 3/2015 |
| CN | 105070053 A | 11/2015 |
| CN | 110494331 A | 11/2019 |
| DE | 102016118497 A1 | 3/2018 |
| EP | 1611560 B1 | 9/2006 |
| EP | 1538019 B1 | 1/2010 |
| EP | 2188168 B1 | 8/2012 |
| JP | 2007139531 A | 6/2007 |
| KR | 100596607 B1 | 7/2006 |
| KR | 101405193 B1 | 6/2014 |
| KR | 101842658 B1 | 3/2018 |
| RU | 2257616 C1 | 7/2005 |
| RU | 76152 U1 | 9/2008 |
| RU | 2369905 C1 | 10/2009 |
| RU | 2601837 C2 | 11/2016 |
| WO | 2019030682 A1 | 2/2019 |
| WO | 2019156914 A1 | 8/2019 |

* cited by examiner

WRONG WAY DRIVING PREVENTION

TECHNICAL FIELD

This application generally relates to transports moving to locations in ways that may be unsafe, illegal, or dangerous, and more particularly, to wrong way driving prevention.

BACKGROUND

Vehicles or transports, such as cars, motorcycles, trucks, planes, trains, etc., generally provide transportation needs to occupants and/or goods in a variety of ways. Functions related to transports may be identified and utilized by various computing devices, such as a smartphone or a computer.

The present application describes a transport approaching a one-way road in a wrong direction. The transport makes an initial determination that the one-way road may possibly be approached in the wrong direction by a slowing down of the transport as it approaches the one way road and a movement of the transport in the direction of the one-way road. If the approach and movement continues, the transport is slowed to prevent entry into the one-way road.

The present application increases transport safety by preventing a transport from entering a one-way road from a wrong direction. In some embodiments, a one-way road may be narrower than two-way roads and not allow transports using the one-way road to either turn around or back up. In some embodiment, a one-way road may not have appropriate exits for transports using the one-way road to either avoid a collision or take an alternate route to a destination. Alternate routes may allow traffic to continue moving and potentially avoid traffic jams. Preventing a transport from entering a one-way road may therefore reduce collisions with other transports and reduce traffic jams.

SUMMARY

One example embodiment provides a method that includes one or more of initially determining, via one or more sensors on a transport, that the transport is approaching a one-way road in a wrong direction based on a slowing down of the transport and a movement of the transport toward the one-way road, notifying, via the one or more sensors, one or more occupants of the transport about the approaching, and in response to the transport continuing to approach in the wrong direction, slowing the transport, by a computer associated with the transport, to not permit entry into the one-way road.

Another example embodiment provides a transport that includes a processor and a memory, coupled to the processor. The memory includes instructions that when executed by the processor are configured to perform one or more of initially determine, via one or more sensors on a transport, that the transport approaches a one-way road in a wrong direction based on the transport slows down and a movement of the transport toward the one-way road and notify, via the one or more sensors, one or more occupants of the transport about the transport approaches the one-way road in the wrong direction, and in response to the transport continues to approach the one-way road in the wrong direction, a computer associated with the transport is configured to slow the transport to not permit entry into the one-way road.

A further example embodiment provides a non-transitory computer readable medium comprising instructions, that when read by a processor, cause the processor to perform one or more of initially determining, via one or more sensors on a transport, that the transport is approaching a one-way road in a wrong direction based on a slowing down of the transport and a movement of the transport toward the one-way road and notifying, via the one or more sensors, one or more occupants of the transport about the approaching, and in response to the transport continuing to approach in the wrong direction, a computer associated with the transport slows the transport to not permit entry into the one-way road.

One example embodiment provides a method that includes one or more of determining, by a transport, that the transport has just performed a dangerous maneuver and notifying, by the transport, one or more occupants of the transport. Notifying includes displaying a road sign image pertaining to the dangerous maneuver on an interior display of the transport.

Another example embodiment provides a transport that includes a processor and a memory, coupled to the processor. The memory includes instructions that when executed by the processor are configured to perform one or more of determine that the transport has just performed a dangerous maneuver and notify, by the transport, one or more occupants of the transport. The transport notifies the occupants includes a road sign image that pertains to the dangerous maneuver is displayed on an interior of the transport.

A further example embodiment provides a non-transitory computer readable medium comprising instructions, that when read by a processor, cause the processor to perform one or more of determining, by a transport, that the transport has just performed a dangerous maneuver and notifying, by the transport, one or more occupants of the transport. Notifying includes displaying a road sign image pertaining to the dangerous maneuver on an interior display of the transport.

One example embodiment provides a method that includes one or more of detecting, by a transport, that the transport is approaching a traffic control marking on a road, providing a notification related to the detecting to one or more occupants of the transport, receiving from one or more other transports, at a server, one or more indications of a crossing of the traffic control marking by the transport, determining, by the server, a consensus of the crossing based on the one or more indications, and performing, by the server, an action to correct the crossing.

Another example embodiment provides a transport that includes a processor and a memory, coupled to the processor. The memory includes instructions that when executed by the processor are configured to perform one or more of detect that the transport approaches a traffic control marking on a road, provide a notification related to the processor detects the transport approaches the traffic control marking, to one or more occupants of the transport, receive, from one or more other transports, at a server, one or more indications of the transport crossed the traffic control marking, determine, by the server, a consensus of the crossed traffic control marking based on the one or more indications, and perform, by the server, an action to correct the crossed traffic control marking.

A further example embodiment provides a non-transitory computer readable medium comprising instructions, that when read by a processor, cause the processor to perform one or more of detecting, by a transport, that the transport is approaching a traffic control marking on a road, providing a notification related to the detecting to one or more occupants of the transport, receiving from one or more other transports, at a server, one or more indications of a crossing of the traffic control marking by the transport, determining, by the server, a consensus of the crossing based on the one or more indications, and performing, by the server, an action to correct the crossing.

One example embodiment provides a method that includes one or more of detecting, by a transport, that more than one other transport ahead are maneuvering toward one or more of a pre-violation and a violation and continuing maneuvering, by the more than one other transports ahead. In response to the continuing maneuvering by the more than one other transports, the method includes maneuvering, by the transport, toward one or more of the pre-violation and the violation.

Another example embodiment provides a transport that includes a processor and a memory, coupled to the processor. The memory includes instructions that when executed by the processor are configured to perform one or more of detect, by the transport, that more than one other transport ahead maneuver toward one or more of a pre-violation and a violation and continue to maneuver, by the more than one other transports ahead. In response to the more than one other transports continue to maneuver, the transport maneuvers toward one or more of the pre-violation and the violation.

A further example embodiment provides a non-transitory computer readable medium comprising instructions, that when read by a processor, cause the processor to perform one or more of detecting, by a transport, that more than one other transports ahead are maneuvering toward one or more of a pre-violation and a violation and continuing maneuvering, by the more than one other transports ahead. In response to the continuing maneuvering by the more than one other transports, the transport maneuvers toward one or more of the pre-violation and the violation.

DETAILED DESCRIPTION

Figure 1A:
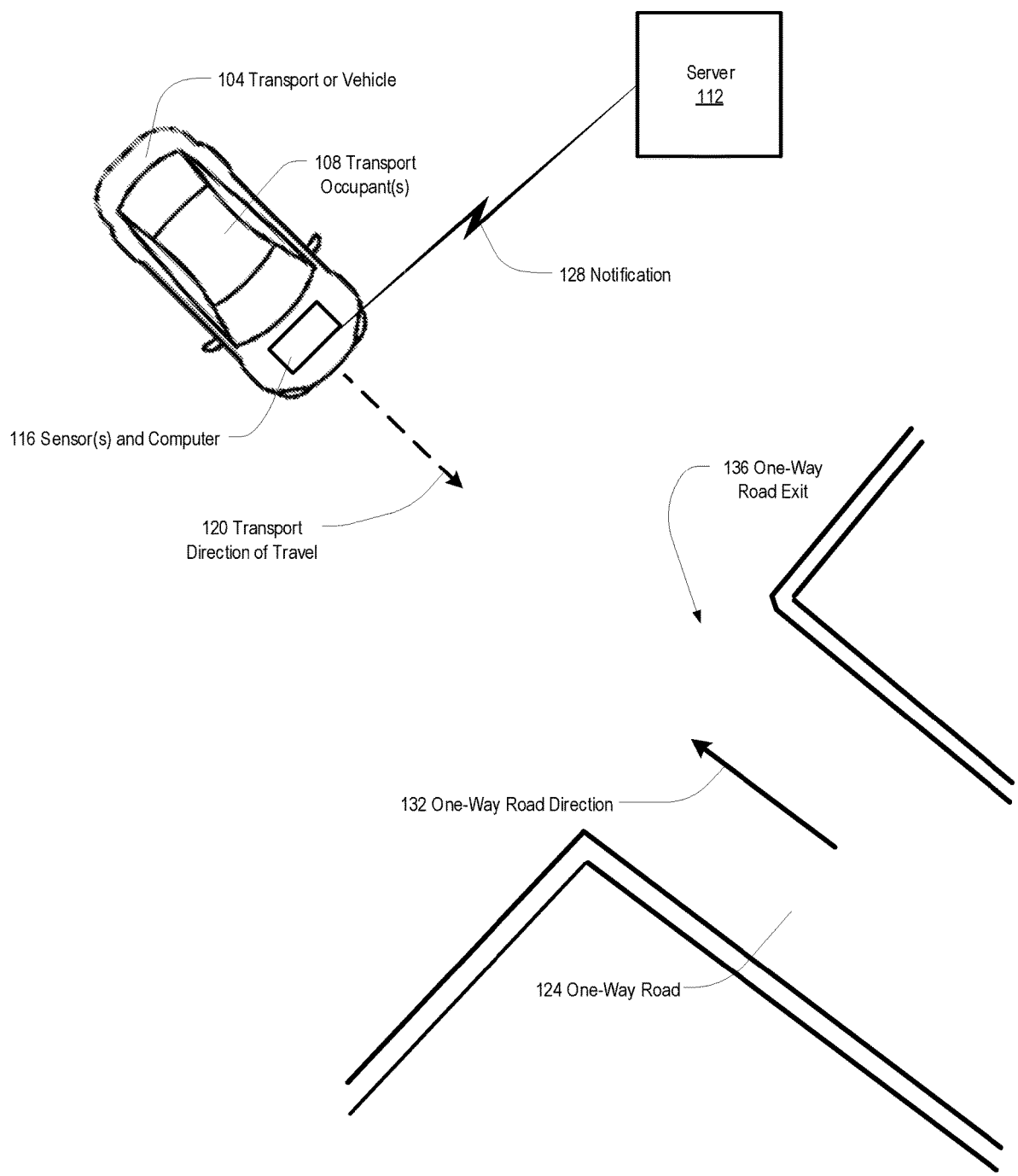
FIG. 1A illustrates an example diagram of a transport approaching an entrance to a one-way road, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout least this specification refers to the fact that a particular feature, structure, or characteristic described in connection with the embodiment may be included in at one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current application, a transport may include one or more of cars, trucks, motorcycles, scooters, bicycles, boats, recreational vehicles, planes, and any object that may be used to transport people and or goods from one location to another.

In addition, while the term "message" may have been used in the description of embodiments, the application may be applied to many types of network data, such as, a packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide at least one of: a transport (also referred to as a vehicle herein) a data collection system, a data monitoring system, a verification system, an authorization system and a vehicle data distribution system. The vehicle status condition data, received in the form of communication update messages, such as wireless data network communications and/or wired communication messages, may be received and processed to identify vehicle/transport status conditions and provide feedback as to the condition changes of a transport. In one example, a user profile may be applied to a particular transport/vehicle to authorize a current vehicle event, service stops at service stations, and to authorize subsequent vehicle rental services.

Within the communication infrastructure a decentralized database is a distributed storage system, which includes multiple nodes that communicate with each other. A blockchain is an example of a decentralized database, which includes an append-only immutable data structure (i.e. a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permissionless blockchain, anyone can participate without a specific identity. Public blockchains can involve cryptocurrencies and use consensus based on various protocols such as proof of work (PoW). On the other hand, a permissioned blockchain database provides a system, which can secure interactions among a group of entities which share a common goal, but which do not or cannot fully trust one another, such as businesses that exchange funds, goods, information, and the like. The instant application can function in a permissioned and/or a permissionless blockchain setting.

Smart contracts are trusted distributed applications which leverage tamper-proof properties of the shared or distributed ledger (i.e., which may be in the form of a blockchain) database and an underlying agreement between member nodes which is referred to as an endorsement or endorsement policy. In general, blockchain entries are "endorsed" before being committed to the blockchain while entries which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node which can receive client submitted entries, commit the entries and maintain a state and a copy of the ledger of blockchain entries. Peers can also have the role of an endorser, although it is not a requirement.

An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database, which maintains a current state of the blockchain. There is typically one ledger per channel. Each peer node maintains a copy of the ledger for each channel of which they are a member.

A chain is an entry log, which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for providing a vehicle service to a particular vehicle and/or requesting user associated with a user profile that is applied to the vehicle. For example, a user may be the owner of a vehicle or the operator of a vehicle owned by another party. The vehicle may require service at certain intervals and the service needs may require authorization prior to permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more sensors which report sensed data to a central controller computer device in the vehicle, which in turn, is forwarded to a management server for review and action. A sensor may be located on one or more of the interior of the transport, the exterior of the transport, on a fixed object apart from the transport, and on another transport near to the transport. The sensor may also be associated with the transport's speed, the transport's braking, the transport's acceleration, fuel levels, service needs, the gear-shifting of the transport, the transport's steering, and the like. The notion of a sensor may also be a device, such as a mobile device. Also, sensor information may be used to identify whether the vehicle is operating safely and whether the occupant user has engaged in any unexpected vehicle conditions, such as during the vehicle access period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., company, agency, etc.) may want to limit the exposure of private information, and therefore the blockchain and its immutability can limit the exposure and manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a "consensus" approach associated with the blockchain. Such an approach could not be implemented on a traditional centralized database.

Every autonomous driving system is built on a whole suite of software and an array of sensors. Machine learning, lidar projectors, radar, and ultrasonic sensors all work together to create a living map of the world that a self-driving car can navigate. Most companies in the race to full autonomy are relying on the same basic technological foundations of lidar+radar+cameras+ultrasonic, with a few notable exceptions.

In another embodiment, GPS, maps and other cameras and sensors are used in autonomous vehicles without lidar as lidar is often viewed as being expensive and unnecessary. Researchers have determined that stereo cameras are a low-cost alternative to the more expensive lidar functionality.

The instant application includes, in certain embodiments, authorizing a vehicle for service via an automated and quick authentication scheme. For example, driving up to a charging station or fuel pump may be performed by a vehicle operator and the authorization to receive charge or fuel may be performed without any delays provided the authorization is received by the service station. A vehicle may provide a communication signal that provides an identification of a vehicle that has a currently active profile linked to an account that is authorized to accept a service which can be later rectified by compensation. Additional measures may be used to provide further authentication, such as another identifier may be sent from the user's device wirelessly to the service center to replace or supplement the first authorization effort between the transport and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record.

FIG. 1A illustrates an example diagram 100 of a transport approaching an entrance to a one-way road, according to example embodiments. A one-way road 124 is a roadway where the direction of travel 132 is in a common direction for all traffic on the roadway. In some embodiments, a one-way road 124 may be so designated at certain times of day or days of the week, and may be permanent or temporary. One-way roads 124 are sometimes configured to provide more efficient traffic movement than two-way roads.

A transport or vehicle 104 may in some cases proceed in a direction 120 opposite to the one-way road direction 132 while approaching an exit 136 from the one-way road 124. In some cases, this may be temporary in order to get around an object or barrier in the road or another transport or vehicle. In other cases, it may be due to a driver or computer and sensor(s) 116 being lost or mistaken and intentionally or unintentionally approaching the one-way road 124. In some embodiments, the transport or vehicle 104 may have one or more passengers or occupants 108. In other embodiments, the transport or vehicle 104 may have no passengers or occupants and be a driverless vehicle, including a cargo transport.

In response to the transport 104 approaching the one-way road 124, the transport 104 may notify one or more occupants 108 of the transport 104. Notifying the one or more occupants may include providing one or more of a visual map and voice instructions to exit the one-way road 124. After notifying the one or more occupants, the transport 104 may wait for a response from the one or more occupants. In one embodiment, if no response is received from the one or more occupants within a time period, the transport 104 may notify one or more appropriate first responders.

The computer 116 in the transport 104 may slow the transport 104 in order to prevent entry of the one-way road 124 in the wrong direction. In response to slowing the transport 104, the computer 116 may invoke one or more functions including but not limited to turning on one or more hazard lights or flashers, or sounding a horn. In some cases, the transport or vehicle 104 may actually enter the one-way road 124. In that case, the computer 116 may stop the transport 104 and one or more of reverse the transport 104 and turn the transport 104 around.

The sensors and computer 116 may provide radar data, sonar data, magnetic detector data, optical sensor data, laser rangefinder data, or any other form of data produced by sensors associated with the transport or vehicle 104. In one embodiment, the onboard computer 116 may include a memory device to store sensor data and associated identifiers and time stamps. In another embodiment, the sensor data and associated identifiers and time stamps may be transmitted to a server 112 for storage and processing. The one or more sensors and computer 116 may determine any of a speed, a position, and a direction for one or more other transports on the one-way road 124.

In one embodiment, a geofence may be defined by the transport or vehicle 104. The geofence may include objects within a fixed radial distance of the transport 104, including other transports. In other embodiments, the geofence may include objects within a context related to the transport 104, including but not limited to a same roadway as the transport 104 or a same parking lot as the transport 104. In one embodiment, in response to one or more other transports within a distance from the transport 104 defined by a geofence, the transport 104 may notify the one or more other transports of the speed, position, and direction of the transport 104.

In one embodiment, the server 112 may include a cloud server, which may store the sensor data and associated identifiers and time stamps to cloud storage. The server 112 may be located anywhere, including in proximity to the transport or vehicle 104 or remote to the transport or vehicle 104. The server 112 receives the sensor data and associated identifiers and time stamps as a notification 128 over any type of data connection, but most likely through wireless connections, including but not limited to cellular connections (i.e. 3G, 4G, 5G, LTE), internet or broadband connections, or WIFI connections. The server 112 may include one or more applications in a memory 706, which may perform processing on the received sensor data and associated identifiers and time stamps.

Figure 1B:
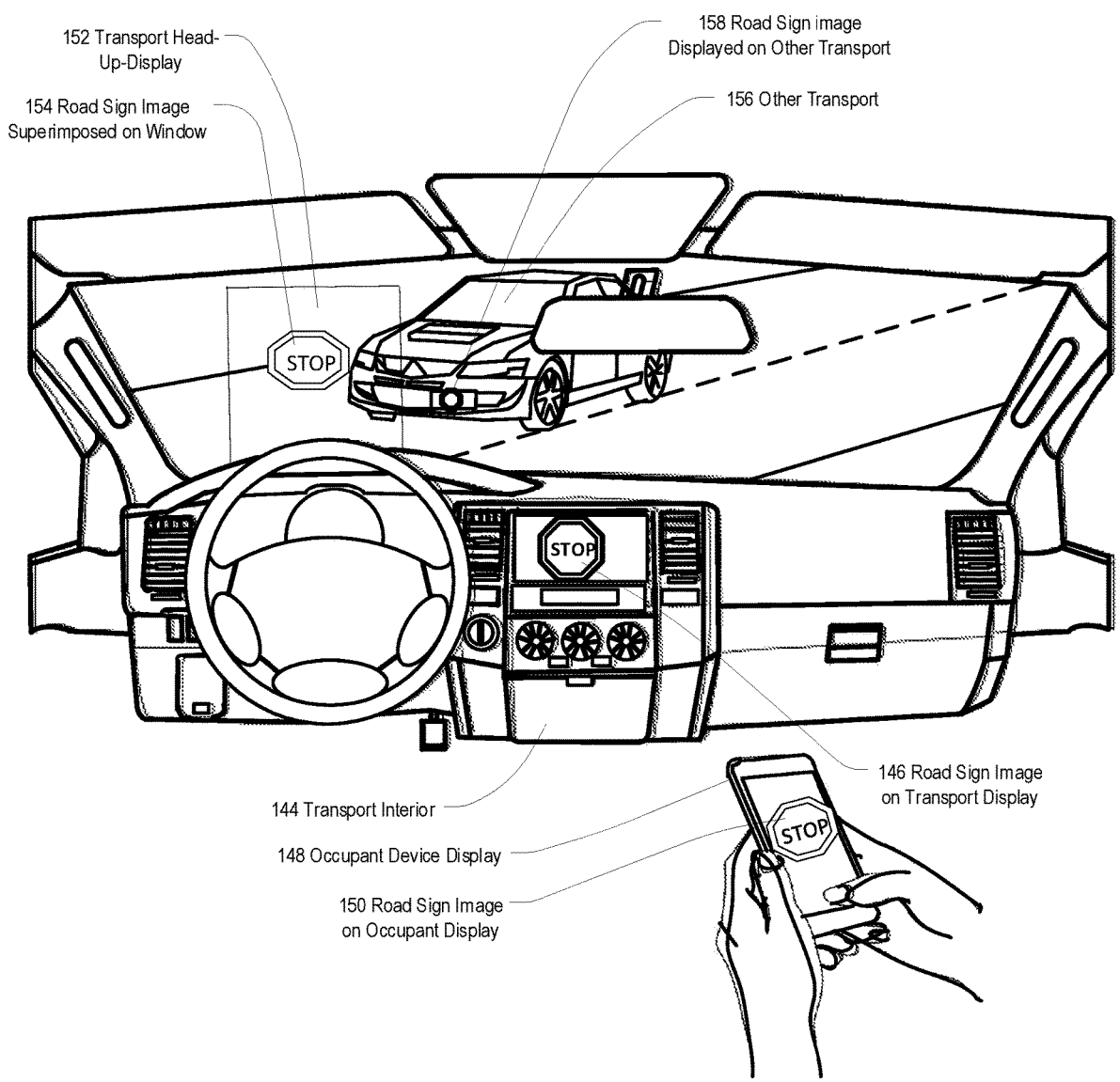
FIG. 1B illustrates an example diagram of displaying a road sign image on various displays on an interior or exterior of a transport, according to example embodiments.

FIG. 1B illustrates an example diagram 140 of displaying a road sign image on various displays on an interior or exterior of a transport, according to example embodiments. A road sign image may be a graphical representation of a street sign or traffic signal. In some embodiments, the road sign image is a text representation. FIG. 1B illustrates a transport interior 144, showing various ways in which a road sign image 146, 150, 154, and 158 may be displayed to one or more occupants of a transport or vehicle 104 (i.e. a transport or vehicle 104 having a transport interior 144).

The transport or vehicle 104 may intentionally or unintentionally pass a traffic control sign without complying with a requirement associated with the passed traffic control sign. Passing a traffic control sign without complying with the sign may be considered a dangerous maneuver. For example, a stop sign directs traffic to come to a complete stop before entering an intersection. If a transport or vehicle 104 passes the traffic control sign, sensors and a computer 116 within the transport 104 may display an image of the passed traffic control sign to one or more occupants within the transport or vehicle 104.

In another embodiment, a traffic signal may have a timing associated with a color or light change, such as transitioning from a green light to a yellow light, then to a red light. The traffic signal or circuitry in proximity to the traffic signal may transmit timing information to one or more transports 104. A computer 116 associated with the transport 104, whether a computer 116 of the transport itself, a user device of a passenger within the transport 104, or a server 112 remote to the transport 104 may receive the timing information and calculate whether the transport 104 will enter the intersection based on current speed, distance, and acceleration of the transport 104. If the computer determines the transport 104 will enter the intersection prior to an applicable traffic signal change (e.g., from Yellow to Red), no action may be taken in one embodiment. In another embodiment, a visual and or audible warning may be provided to one or more occupants of the transport. If instead the computer determines the transport 104 will enter the intersection after an applicable traffic signal change (e.g., from Yellow to Red), a visual and or audible warning may be provided to one or more occupants of the transport in one embodiment. In another embodiment, the computer 116 may slow or stop the transport 104 if that may be performed safely given speed, distance, and road/weather conditions.

The transport 104 may include various sensors and computers 116 that may detect the transport 104 performing a dangerous maneuver. After detecting the dangerous maneuver, the transport 104 may notify one or more occupants of the transport 104. In one embodiment, the transport or vehicle 104 may notify the one or more occupants by displaying the road sign image 146 on a transport display, such as an entertainment and navigation display within the transport or vehicle 104. In another embodiment, the transport or vehicle 104 may display the road sign image 150 on an occupant device display 148. An occupant device may include any computing and communication device associated with an occupant of the transport 104 rather than the transport 104 itself, and may include a smartphone, a tablet, a laptop or notebook computer, and any form of mobile or wearable computer. In another embodiment, the transport or vehicle 104 may display the road sign image 154 superimposed on a window of the transport 104, such as with a head-up display 152. In yet another embodiment, another transport 156 may display the road sign image 158. For example, a conventional license plate location may instead include a display screen. Most of the time, this display screen may display the license plate number. However, in a case as described here, the display screen may instead display the road sign image 158 to the transport or vehicle 104. In other embodiments, other portions of the other transport 156 may display the road sign image 158, and multiple parts of the other transport 156 may display the road sign image 158.

The road sign image 146, 150, 154, 158 may correspond to a road sign the transport 104 has just passed by to cause the dangerous condition or a traffic signal for an intersection the transport 104 is entering. In one embodiment, the displayed road sign image 146, 150, 154, 158 may become more pronounced as the transport 104 moves further past the road sign. In addition to notifying by displaying the road sign image 146, 150, 154, 158, notifying may also include one or more of the transport 104 and an occupant device 148 providing an audio notification related to the dangerous maneuver. In some embodiments, when the transport 104 continues performing the dangerous maneuver, the transport 104 may provide a warning to one or more other transports 156 in proximity to the transport 104.

The transport or vehicle 104 may also be part of a blockchain network. The blockchain network may either be a public or permissioned blockchain network. In one embodiment, the transport or vehicle 104 may retrieve a shared ledger from the blockchain network, which may include one or more transactions related to the transport 104. The shared ledger of the blockchain network may be updated to include an indication of the road sign, a time of displaying the road sign image, and a location of the transport 104.

In another embodiment, the transport 104 may initiate a potentially dangerous or illegal motion. The transport 104 next detects one or other transports 156 in motion within a boundary, and obtains speed, direction, and distance of the other transports 156 within the boundary. The transport 104 notifies one or more occupants of the transport 104 and/or the other transports 156 in response to a combination of the speed, the direction, and the distance are above a threshold.

The transport 104 may determine other transport(s) 156 are within a geofence of the transport 104 or in a potential collision path based on continued movement. The transport 104 may notify other transport(s) 156 of a potential collision with the transport 104, where the notification includes a message to a device of one or more occupants of the other transport(s) 156. The device may provide an unmutable and audible voice warning on other devices of other transports 156.

In some embodiments, the transport 104 may retrieve a shared ledger associated with a blockchain network including the transport 104 and update the shared ledger to include each notification provided to a device or another transport 156. The transport 104 may generate a blockchain transaction to run a smart contract to determine a number and frequency of notifications in a period of time and notify an insurance provider in response to the number and frequency of notifications in a period of time are above a threshold.

Figure 1C:
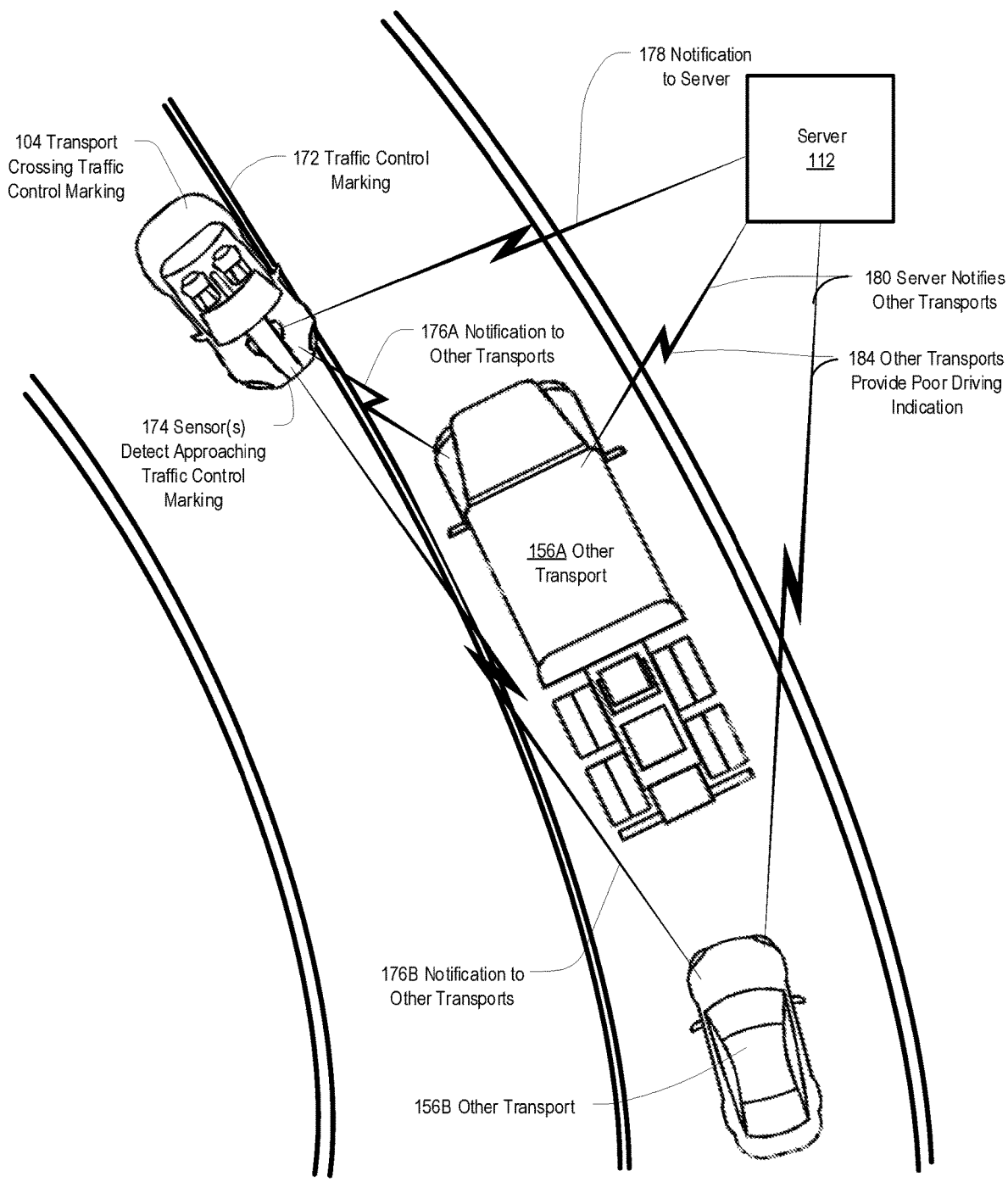
FIG. 1C illustrates an example diagram of a transport approaching or crossing a traffic control marking on a roadway, according to example embodiments.

FIG. 1C illustrates an example diagram 170 of a transport approaching or crossing a traffic control marking on a roadway, according to example embodiments. Almost all roadways include one or more traffic control markings 172. Traffic control markings 172 include all permanent or semi-permanent markings on a roadway that may be intended to control or direct transport movement in some fashion. In some embodiments, traffic control markings 172 may delineate a lane boundary for the transport 104. The lane boundary may indicate a boundary for a moving transport 104 such as lines on the sides or center of a roadway, or a boundary for a parked transport 104 such as in a parking lot or curbside on a roadway. Semi-permanent markings may include construction or other markings that are temporary in nature and may be moved or changed over time. In some embodiments, traffic control markings 172 may include painted markings. In other embodiments, traffic control markings 172 may include text or signage affixed to a roadway with tape or glue. In yet other embodiments, traffic control markings 172 may include electronic markings on a display either affixed to a roadway or embedded within a roadway. For example, such markings on a display may be useful for roadways where traffic patterns may change daily or during certain hours of the day. In such a case, a roadway may be marked or indicated as a one-way road in a first direction for a morning rush hour, and a one-way road in an opposite direction for an evening rush hour.

A transport or vehicle 104 approaches and then crosses the traffic control marking 172. The roadway may include one or more other transports 156A, 156B that may be proceeding in a common or different direction from the transport or vehicle 104. FIG. 1C illustrates other transports 156A, 156B proceeding in an opposite direction to the transport or vehicle 104 that crosses the traffic control marking 172. The transport or vehicle 104 may include one or more sensors that detect the approach of the traffic control marking 174. The one or more sensors 174 may include any combination of cameras, radar, lidar, optical scanners, UV or IR sensors, or any other type of sensors suitable for sensing traffic control markings 172.

The transport or vehicle 104 notifies one or more occupants of the transport 104 as it approaches the traffic control markings 172. The notification may be related to detecting the approach to the traffic control marking 172. This may give the occupants and opportunity to control the transport 104 in order to avoid the traffic control markings 172 and keep the transport 104 within a safe position or location on the roadway. However, this notification may not always result in the transport 104 making a safe adjustment. In some embodiments, the transport 104 may continue approaching and cross the traffic control marking 172.

The sensor(s) 174 may detect the traffic control marking 172 being crossed by the transport 104. In response, the transport 104 may transmit one or more notifications 176A, 176B to the other transports 156A, 156B, respectively. The notification(s) may provide an indication that the transport 104 has crossed the traffic control marking 172, a location or direction of the transport 104, or an instruction to maneuver the other transport(s) 156 to avoid a collision. Any such notification(s) may be presented to one or more occupant(s) of the other transport(s) 156 as a visual message, and audible message, or a combination of visual and audible. The other transports 156 may provide one or more indications of crossing the traffic control marking 172 each time the transport 104 crosses the traffic control marking 172.

Alternately or in combination the transport 104 may transmit the notification(s) 178 to a server 112. The server 112 may store the notification(s), append information to the notification(s), and/or forward the notification(s) 180 to the other transports 156. Such notification(s) through the server 112 may be in lieu of or in addition to notification(s) 178 provided directly to the other transport(s) 156. In one embodiment, the server 112 may receive one or more indications of a crossing of the traffic control marking 172 by the transport 104. In response, the server 112 may determine a consensus of the crossing based on the one or more indications and perform an action to correct crossing the traffic control marking 172. In one embodiment, the action may include stopping and reversing the transport 104. In another embodiment, the action may include notifying one or more other transports 156 in proximity to the transport 104 in order to take an alternate route or perform an evasive movement. In another embodiment, the action may include turning the transport 104 around.

In one embodiment, the consensus may be based on similar observations of the transport 104 by other transport(s) 156. In another embodiment, the transport 104 and/or other transport(s) 156 may include validation nodes or peers of a blockchain network. In some embodiments, the server 112 may create one or more blockchain transactions to record an instance of poor driving related to the consensus to a shared ledger of the blockchain network. The other transport(s), as validation nodes or peers, may perform the consensus on the blockchain transaction(s). In one embodiment, the other transports 156 may transmit a poor driving indication 184 to the server 112. From the received poor driving indications 184, the server 112 may determine if a consensus exists and itself provide further notifications to another organization as well as or instead of the transport 104. Other organizations may include law enforcement, first responders, insurance companies, or relatives/next of kin of occupants of the transport 104.

After the transport 104 crosses the traffic control marking 172, the server 112 may identify other transport(s) 156 and the transport 104 approaching one another, calculate a potential impact between the transport 104 and the other transport(s) 156 and notify one or more occupants of the transport 104 and the other transport(s) 156 about a potential impact. The notifications may include a visual message, an audible message, or both delivered to the transport 104 itself or to one or more user devices 148 as previously described. In one embodiment, provided notifications may override whatever is currently displayed or current audio from the transport 104 or user devices 148.

In another embodiment, one or more sensors on a transport 104 may detect that another transport 156 is traveling toward the transport 104. The transport 104 may determine that an alternate path is not available for the transport 104 and the other transport 156. A computer communicatively coupled to the one or more sensors 116 may calculate an action including one or more of an evasive maneuver, slowing of the transport 104 and/or the other transport 156, and stopping the transport 104 and/or the other transport 156. The computer 116 may notify one or more occupants of the transport 104 and the other transport 156 of the action. One or more sensors and the computer 116 on the transport 104 determine a speed, a position, and a direction of the other transport 156. In some embodiments, the one or more sensors and the computer 116 on the transport 104 determine the one-way road 124 is blocked by the other transport 156. In one embodiment, the transport 104 determines if an alternate exit is available from the one-way road 124 prior to encountering the other transport 156 and notifies a driver of the other transport 156.

In one embodiment, the other transport 156 or a server 112 calculates an estimated time that the other transport 156 will exit the one-way road 124 and determines an estimated time to reach the transport 104 along the one-way road 124. In response to the estimated time that the other transport 156 will exit the one-way road 124 is prior to the estimated time to reach the transport 104, the other transport 156 maintains travel on the one-way road 124. In response to the estimated time that the other transport 156 will exit the one-way road 124 is after the estimated time to reach the transport 104, the other transport 156 may slow down or stop on the one-way road 124.

In one embodiment, the other transport 156 is part of a private or permissioned blockchain network, and creates a first blockchain transaction to remove the transport 104 from a pool of validation nodes or peers. The other transport 156 may also generate a second blockchain transaction to record an identifier for the transport 104, a time and/or a date, and a location of the transport 104 to a distributed ledger of the blockchain network.

Figure 1D:
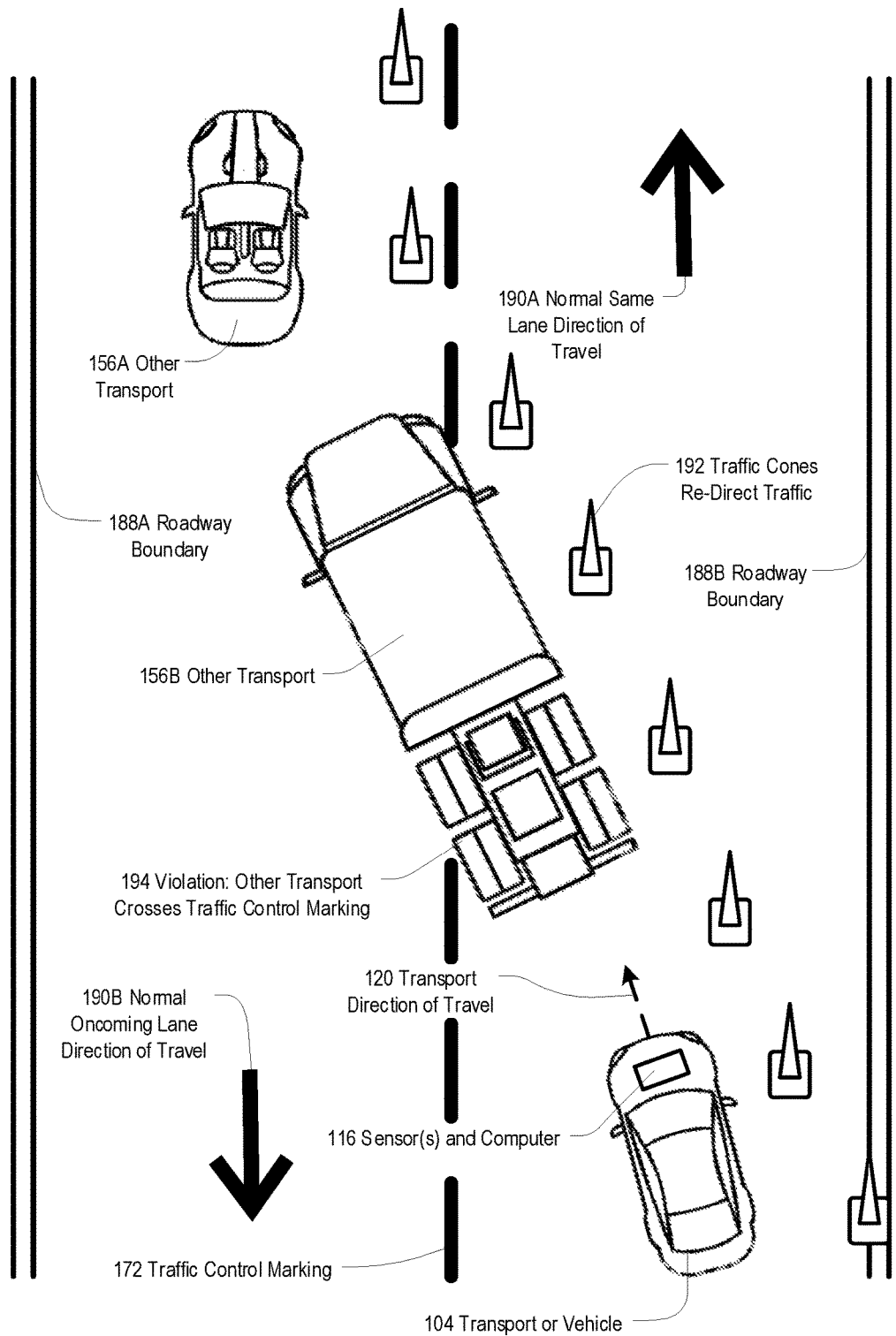
FIG. 1D illustrates an example diagram of a transport following other transports while crossing a traffic control marking on a roadway, according to example embodiments.

FIG. 1D illustrates an example diagram of a transport following other transports while crossing a traffic control marking on a roadway 186, according to example embodiments. FIG. 1D illustrates a transport or vehicle 104 that reacts to movement or maneuvering by other transports 156A, 156B. There are at least two other transports 156 ahead of the transport or vehicle 104.

Transport movement along roadways is controlled by roadway boundaries 188 and/or traffic control markings 172. FIG. 1D shows first and second roadway boundaries 188A, 188B that identify side boundaries of a roadway. The illustrated roadway is a two-way roadway, with a single lane in each direction divided by a dashed line designating a traffic control marking 172. Traffic in the right hand lane normally proceeds in a same lane direction of travel 190A, identified by arrow 190A. Traffic in the left hand lane normally proceeds in an oncoming lane direction of travel 190B, identified by arrow 190B. Crossing a traffic boundary 188A, 188B or a traffic control marking 172 may constitute a violation 194. Approaching such a boundary 188A, 188B or marking 172 may constitute a pre-violation if the transport in question 104, 156A, 156B would cross the boundary 188A, 188B or marking 172 if it continues on the present course. It should be understood that FIG. 1D illustrates only one example of a violation 194, and many other types of violations 194 or pre-violations are possible.

In the example illustrated in FIG. 1D, construction may be occurring in all or part of the right hand lane (not shown), and traffic is being diverted by a series of traffic cones 192 in the area leading up to the construction. The placement pattern of the traffic cones 192 may indicate that traffic should proceed to the left land and stay in the left lane until the traffic cone 192 pattern directs traffic back into the right hand lane. This results in only one lane, the left lane, where traffic may proceed in proximity to the construction. In one embodiment, there may be one or more flag personnel (not shown) that direct traffic through the lane-restricted area. The flag personnel typically coordinate traffic flow between them so that only one traffic direction is enabled at the same time, in order to prevent traffic jams or collisions.

The transport or vehicle 104 may include one or more sensors and a computer 116 to communicate between the transports 104, 156A, 156B and possibly with a server 112 (not shown). Transport 104 proceeds in a direction of travel 120, which may result in a pre-violation or a violation 194 as it approaches and ultimately crosses a roadway boundary 188A, 188B or a traffic control marking 172. In one embodiment, the sensor(s) and computer 116 may detect that more than one other transport 156A, 156B ahead are moving or maneuvering toward one or more of a pre-violation or a violation 194. There may or may not be traffic control cones 192, personnel directing traffic, detour signage, or other identification of a traffic change present. The more than one other transports 156A, 156B continue maneuvering and commit pre-violations and violations 194. Observing this continued movement, the transport 104 proceeds toward one or more of the pre-violation and the violation 194, ultimately committing a violation of traffic control markings 172, roadway boundaries 188A, 188B, or other signage.

In one embodiment, the transport 104 may not continue movement or maneuvering in response to one or more of the other transports 156A, 156B is an emergency vehicle providing an emergency response indication. An emergency vehicle may include a police car, a fire engine, an ambulance, or any other form of identified transport being operated by a first responder. An emergency response indication may include flashing lights, a siren, or any other visual or audible signals produced by the emergency vehicle. It is generally dangerous to follow an emergency vehicle when it is responding to an emergency situation, and in many cases traffic laws require non-emergency vehicles to move to the side of a roadway and stop. However, when an emergency vehicle does not provide an emergency response indication, the emergency vehicle is treated as any other non-emergency vehicle. This means that the transport 104 following emergency vehicles in those situations is expected or required.

In another embodiment, the transport 104 may not continue movement or maneuvering in response to only one other transport 156A, 156B ahead is maneuvering toward one or more of the pre-violation and the violation. When only one other transport 156A, 156B is maneuvering toward one or more of the pre-violation and the violation, that may indicate an out-of-control other transport 156A, 156B due to a medical condition, distracted driving, or some other reason. Following such another transport 156A, 156B may therefore not be recommended.

In one embodiment, the transport or vehicle 104 may receive a notification and/or a camera image from one or more of the other transports 156A, 156B ahead and maneuver the transport 104 in response. The notification or the camera image may indicate an accident, unsafe roadway, or other condition that requires the transport 104 to maneuver in order to avoid the unsafe condition. In another embodiment, the transport or vehicle 104 may receive a notification and/or a camera image from one or more other transports 156A, 156B ahead, determine the notification or camera image indicates a traffic accident, and detour the transport away from the pre-violation and the violation 194.

Figure 2A:
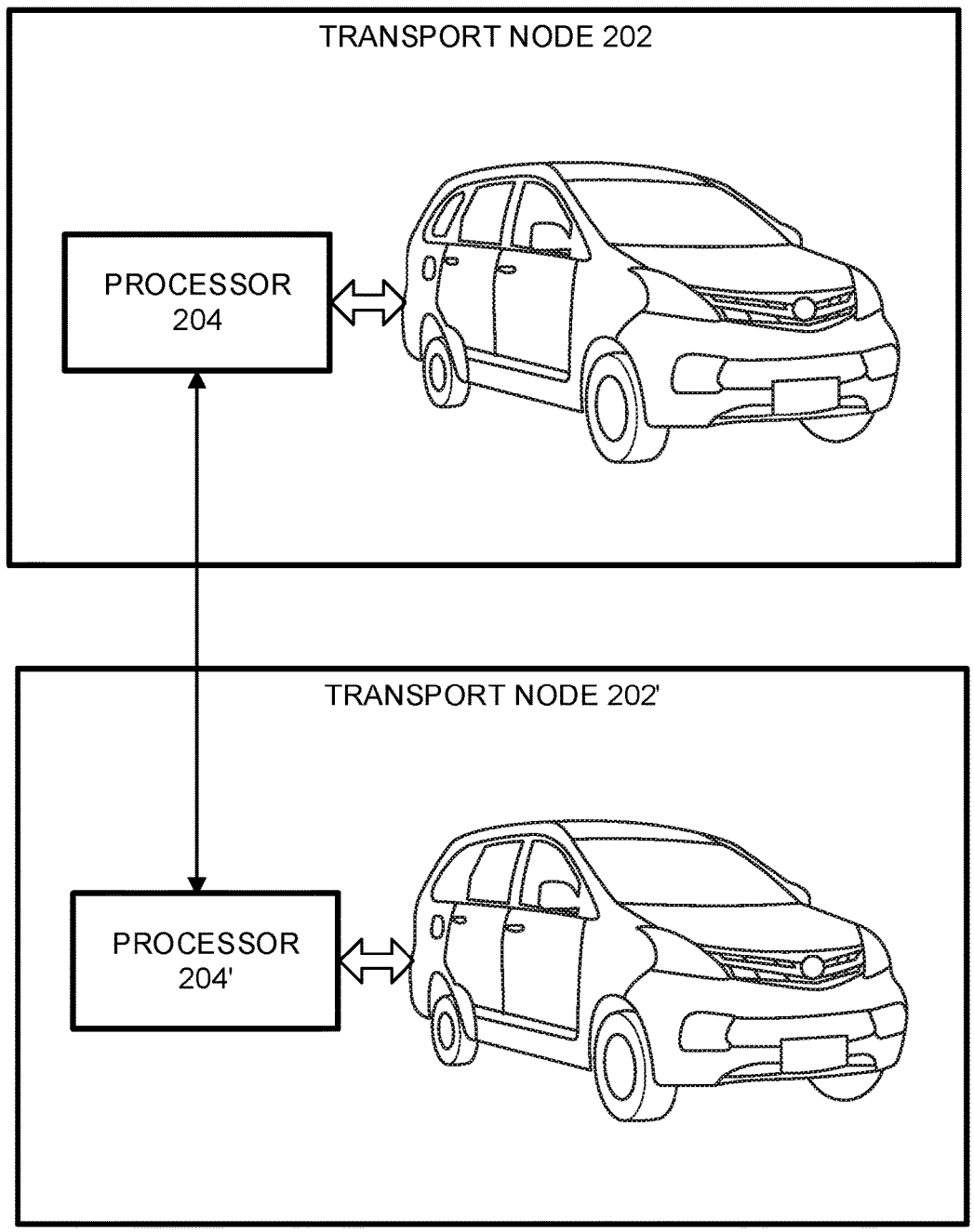
FIG. 2A illustrates a transport network diagram, according to example embodiments.

FIG. 2A illustrates a transport network diagram 200, according to example embodiments. The network comprises elements including a transport node 202 including a processor 204, as well as a transport node 202' including a processor 204'. The transport nodes 202, 202' communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. Although depicted as single transport nodes and processors, a plurality of transport nodes and processors may be present. One or more of the applications, features, steps, solutions, etc., described and/or depicted herein may be utilized and/or provided by the instant elements.

Figure 2B:
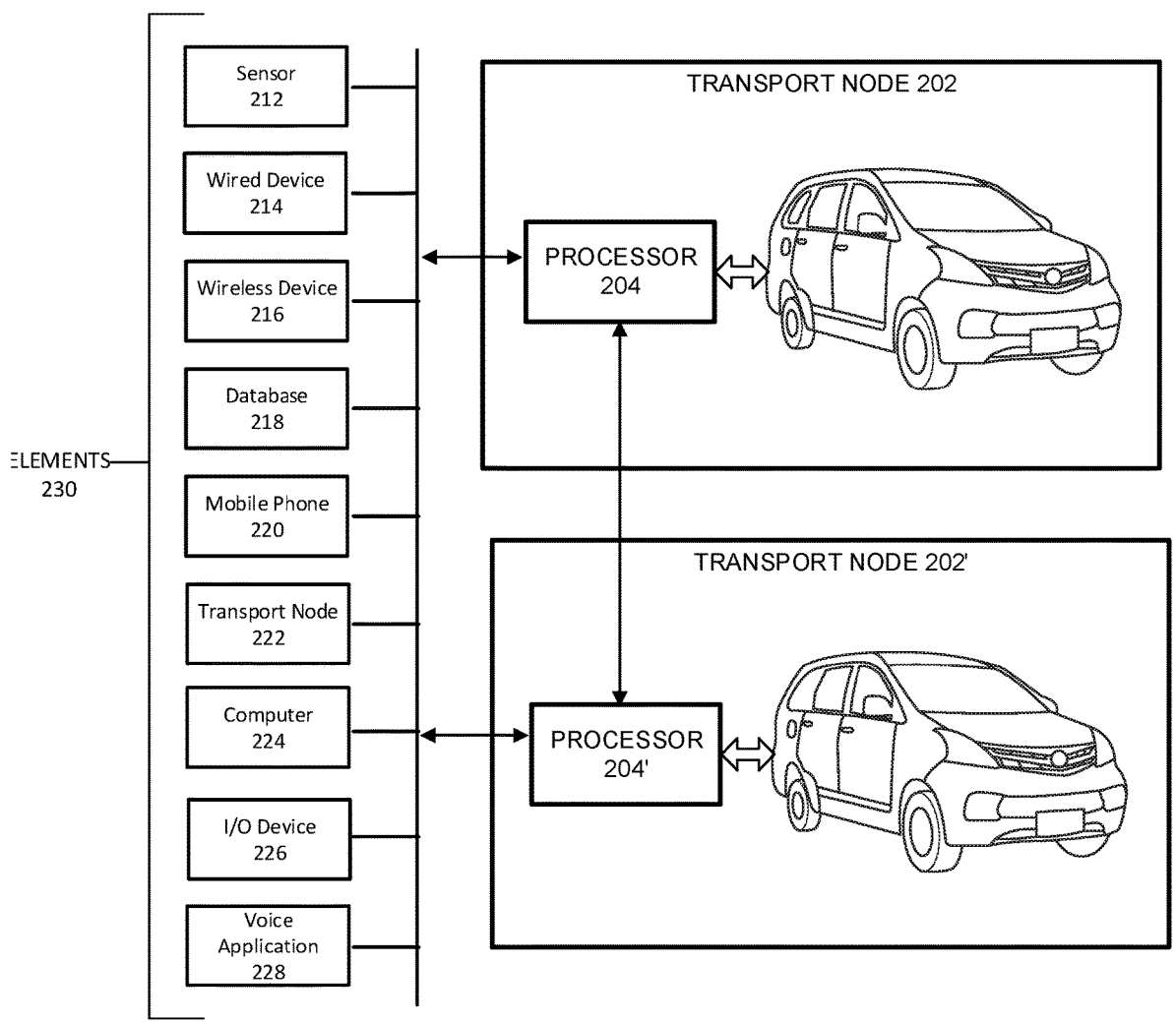
FIG. 2B illustrates another transport network diagram, according to example embodiments.

FIG. 2B illustrates another transport network diagram 210, according to example embodiments. The network comprises elements including a transport node 202 including a processor 204, as well as a transport node 202' including a processor 204'. The transport nodes 202, 202' communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. The processors 204, 204' can further communicate with one or more elements 230 including sensor 212, wired device 214, wireless device 216, database 218, mobile phone 220, transport node 222, computer 224, I/O device 226 and voice application 228. The processors 204, 204' can further communicate with elements comprising one or more of a processor, memory, and software.

Although depicted as single transport nodes, processors and elements, a plurality of transport nodes, processors and elements may be present. Information or communication can occur to and/or from any of the processors 204, 204' and elements 230. For example, the mobile phone 220 may provide information to the processor 204 which may initiate the transport node 202 to take an action, may further provide the information or additional information to the processor 204' which may initiate the transport node 202' to take an action, may further provide the information or additional information to the mobile phone 220, the transport node 222, and/or the computer 224. One or more of the applications, features, steps, solutions, etc., described and/or depicted herein may be utilized and/or provided by the instant elements.

Figure 2C:
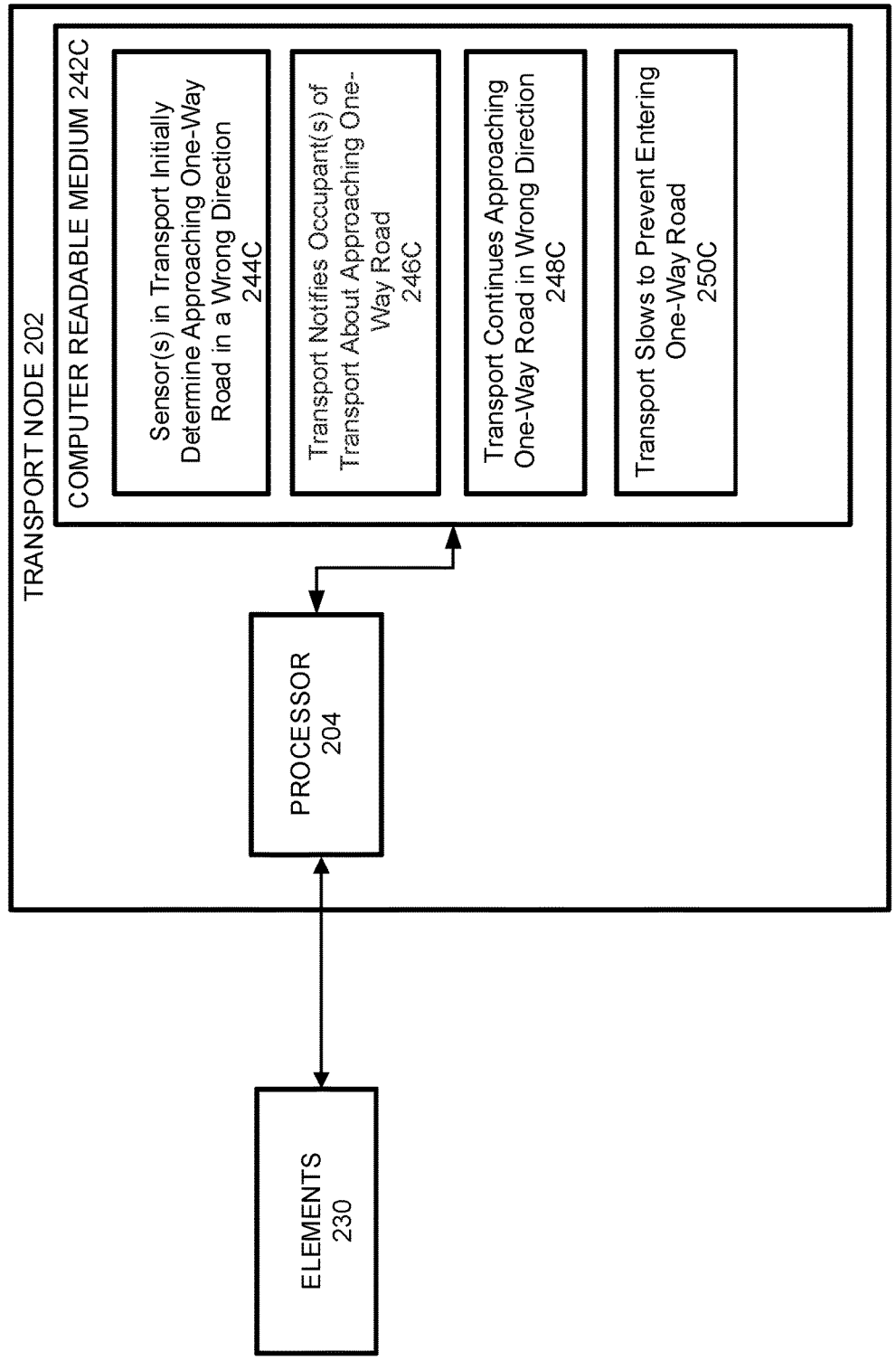
FIG. 2C illustrates yet another transport network diagram, according to example embodiments.

FIG. 2C illustrates yet another transport network diagram 240, according to example embodiments. The network comprises elements including a transport node 202 including a processor 204 and a non-transitory computer readable medium 242C. The processor 204 is communicably coupled to the computer readable medium 242C and elements 230 (which were depicted in FIG. 2B).

The processor 204 performs one or more of the following steps: sensors in a transport 104 initially determine approaching a one-way road 124 in a wrong direction 244C, the transport 104 notifies one or more occupants of the transport 104 about approaching the one-way road 246C, the transport 104 continues approaching the one-way road 124 in a wrong direction 248C, and the transport 104 slows to prevent entering the one-way road 250C.

The processor 204 initially determines that the transport 104 approaches the one-way road 124 in the wrong direction includes one or more of a turn signal, the transport 104 slows down, and a steering wheel of the transport 104 turns the transport 104 toward the one-way road 124.

Figure 2D:
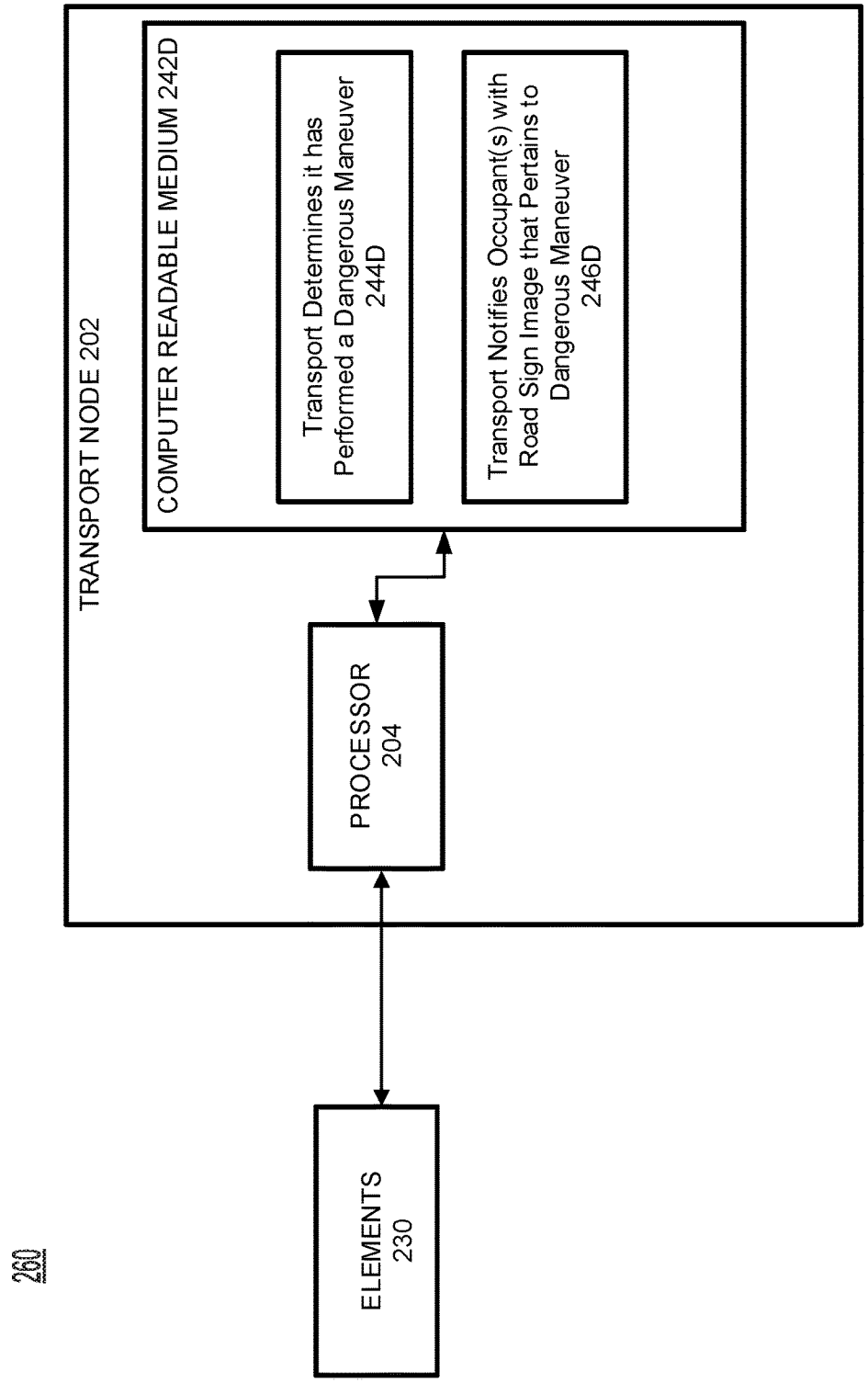
FIG. 2D illustrates a further transport network diagram, according to example embodiments.

FIG. 2D illustrates a further transport network diagram 260, according to example embodiments. The network comprises elements including a transport node 202 including a processor 204 and a non-transitory computer readable medium 242D. The processor 204 is communicably coupled to the computer readable medium 242D and elements 230 (which were depicted in FIG. 2B).

The processor 204 performs one or more of the following steps: a transport 104 determines it has performed a dangerous maneuver 244D, and the transport 104 notifies one or more occupants with a road sign image 146, 150, 154, 158 that pertains to the dangerous maneuver 246D. In another embodiment, the server 112 or another transport 156 in proximity to the transport 104 may determine the transport 104 has performed a dangerous maneuver.

Figure 2E:
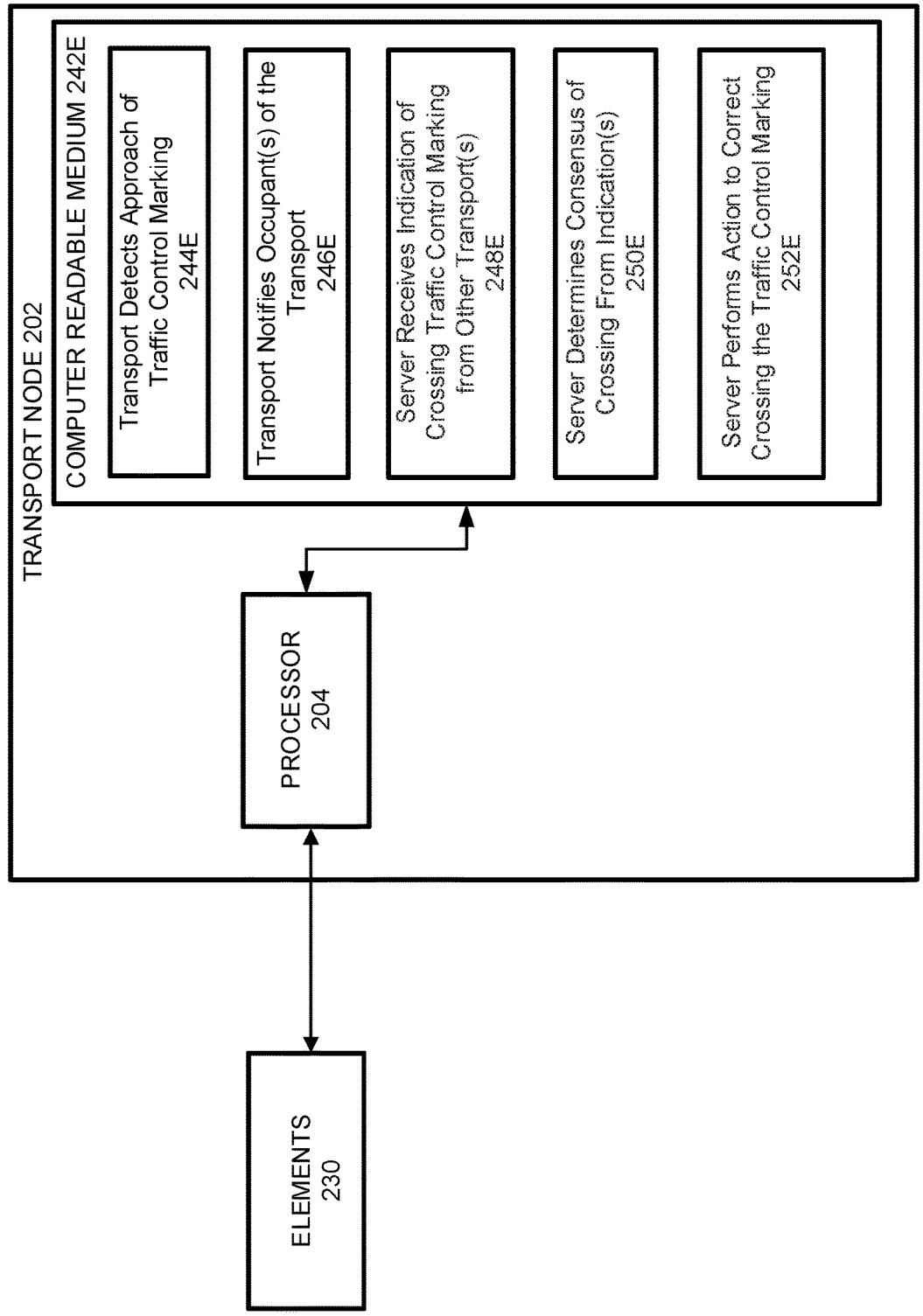
FIG. 2E illustrates a yet further transport network diagram, according to example embodiments.

FIG. 2E illustrates a yet further transport network diagram 270, according to example embodiments. The network comprises elements including a transport node 202 including a processor 204 and a non-transitory computer readable medium 242E. The processor 204 is communicably coupled to the computer readable medium 242E and elements 230 (which were depicted in FIG. 2B).

The processor 204 performs one or more of the following steps: the transport 104 detects approach of a traffic control marking 244E, the transport 104 notifies one or more occupant(s) of the transport 246E, a server 112 receives an indication of crossing the traffic control marking 172 from one or more other transports 248E, the server 112 determines a consensus of crossing the traffic control marking 172 from the indication 250E, and the server 112 performs one or more actions to correct crossing the traffic control marking 252E.

Figure 2F:
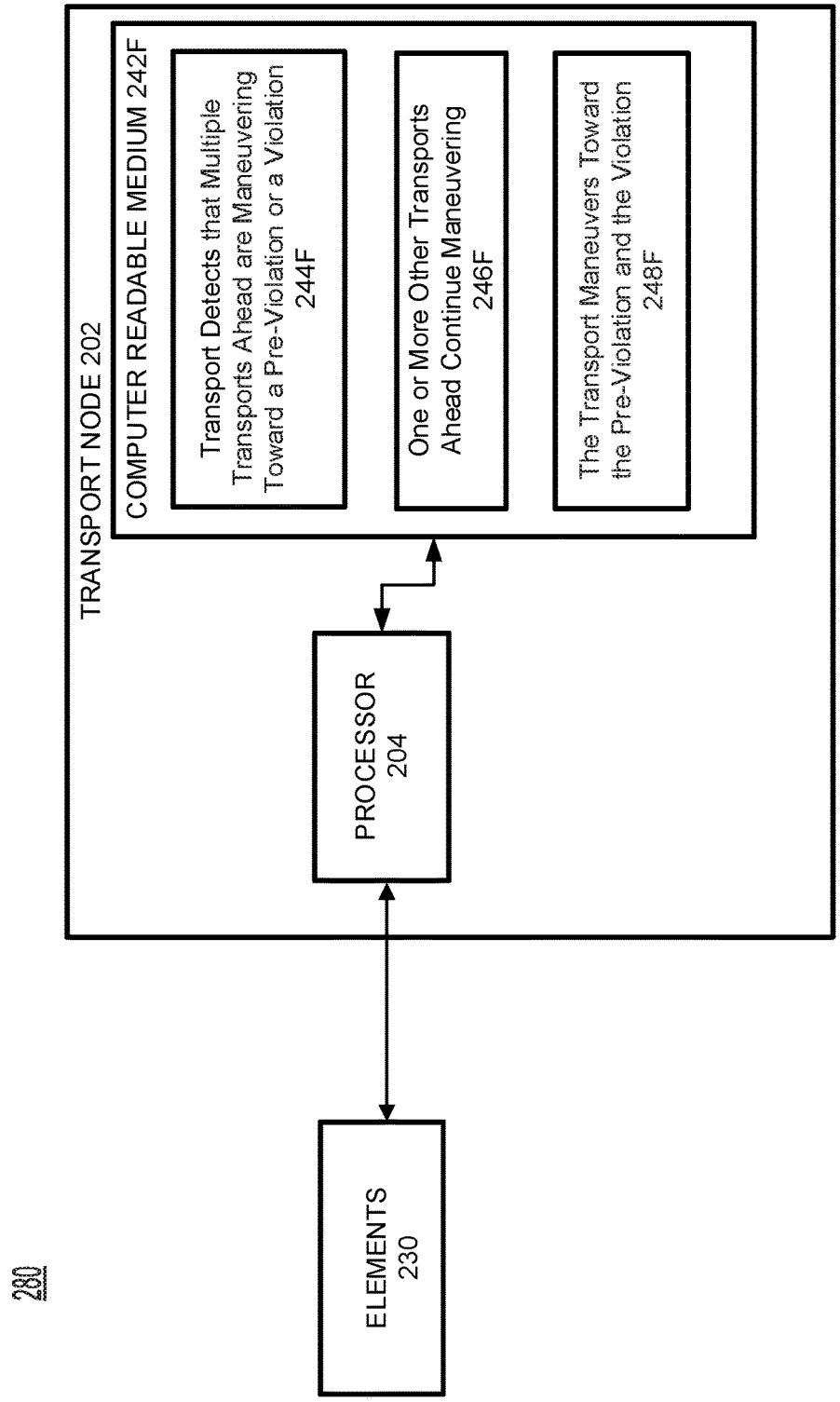
FIG. 2F illustrates a yet further transport network diagram, according to example embodiments.

FIG. 2F illustrates a yet further transport network diagram 280, according to example embodiments. The network comprises elements including a transport node 202 including a processor 204 and a non-transitory computer readable medium 242F. The processor 204 is communicably coupled to the computer readable medium 242F and elements 230 (which were depicted in FIG. 2B).

The processor 204 performs one or more of the following steps: At step 244F, a transport 104 detects that multiple transports 156 ahead are maneuvering toward a pre-violation or a violation 194. Detecting may include the more than one other transports 156 are proceeding in a same direction as the violation, or oncoming traffic is stopped. At step 246F, one or more other transports 156 ahead continue maneuvering. Continuing maneuvering by the more than one other transports 156 ahead may include one or more of slowing down of the more than one other transports 156, a person directing traffic flow, and one or more traffic signs authorizing a violation. Finally, at step 248F, the transport 104 maneuvers toward the pre-violation or the violation 194.

The processors 204 and/or computer readable media 242 may fully or partially reside in the interior or exterior of the transport nodes 104. The steps or features stored in the computer readable media 242 may be fully or partially performed by any of the processors 204 and/or elements 230 in any order. Additionally, one or more steps or features may be added, omitted, combined, performed at a later time, etc.

Figure 3A:
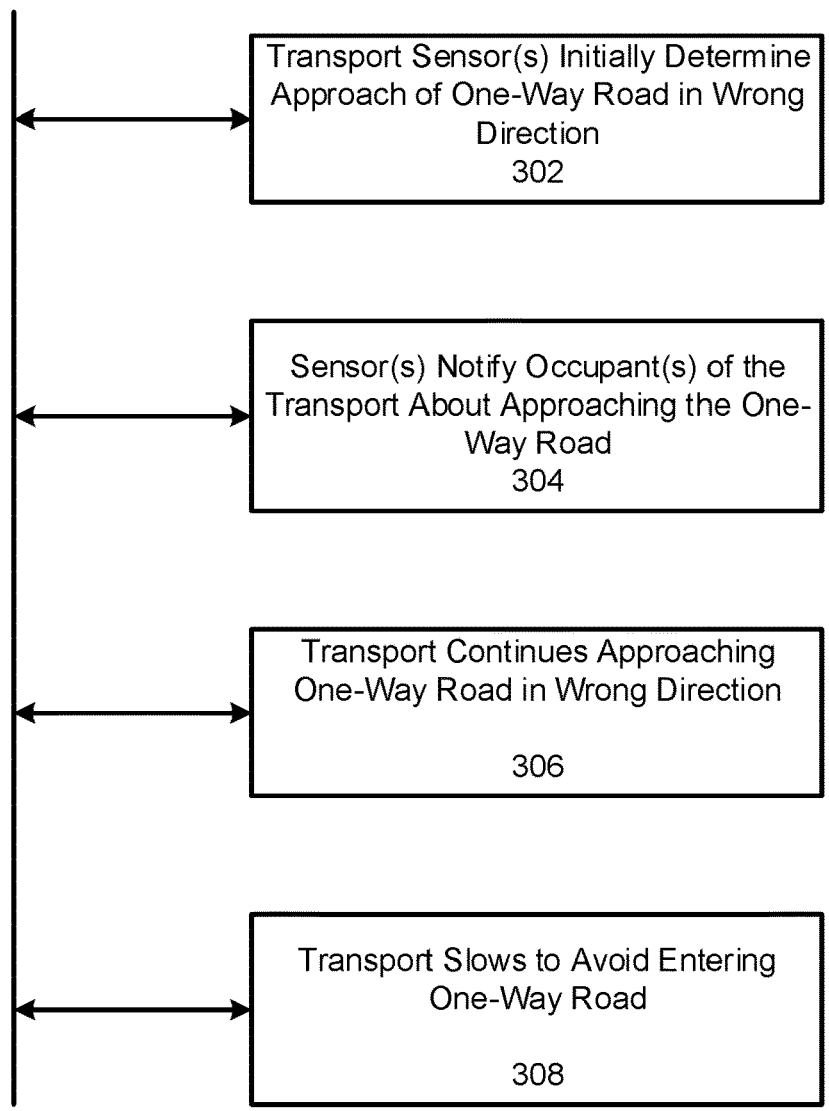
FIG. 3A illustrates a flow diagram, according to example embodiments.

FIG. 3A illustrates a flow diagram 300, according to example embodiments. Referring to FIG. 3A, flow begins at block 302. At block 302, a transport's sensor(s) 116 initially determine approach of a one-way road 124 in a wrong direction. At block 304, the sensor(s) 116 notify one or more occupants of the transport 104 about approaching the one-way road 124. At block 306, the transport 104 continues approaching the one-way road 124 from a wrong direction. Finally, at block 308, the transport 104 slows to avoid entering the one-way road 124.

Figure 3B:
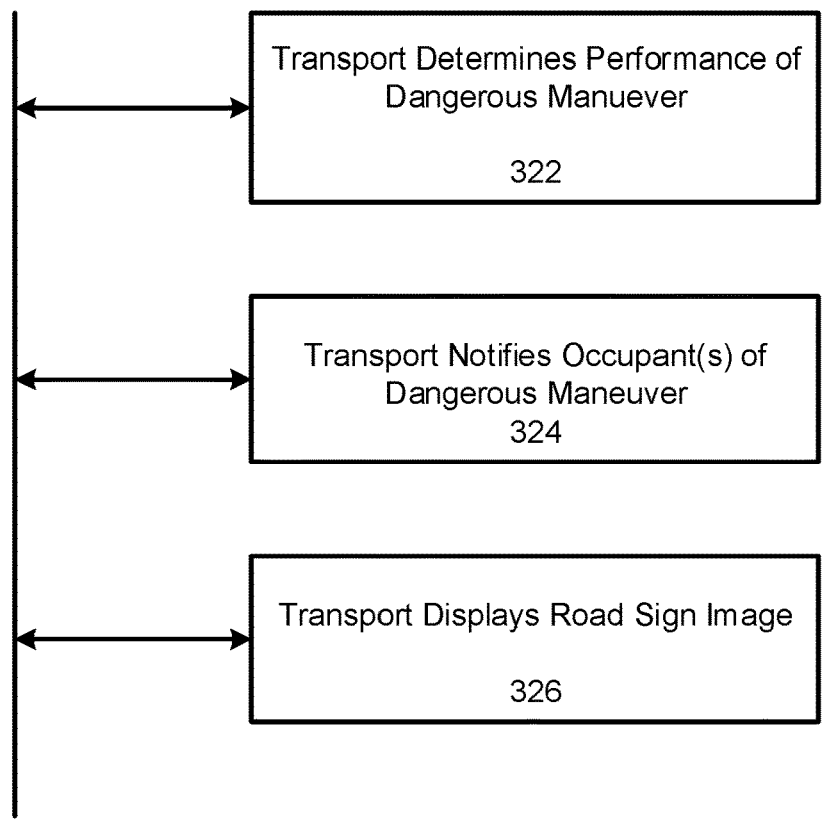
FIG. 3B illustrates another flow diagram, according to example embodiments.

FIG. 3B illustrates another flow diagram 320, according to example embodiments. Referring to FIG. 3B, the flow begins at block 322. At block 322, a transport 104 determines it has performed a dangerous maneuver. At block 324, the transport 104 notifies one or more occupants of the transport 104 about the dangerous maneuver performed. At block 326, the transport 104 or another transport 156 displays a road sign image 146, 150, 154, 158.

Figure 3C:
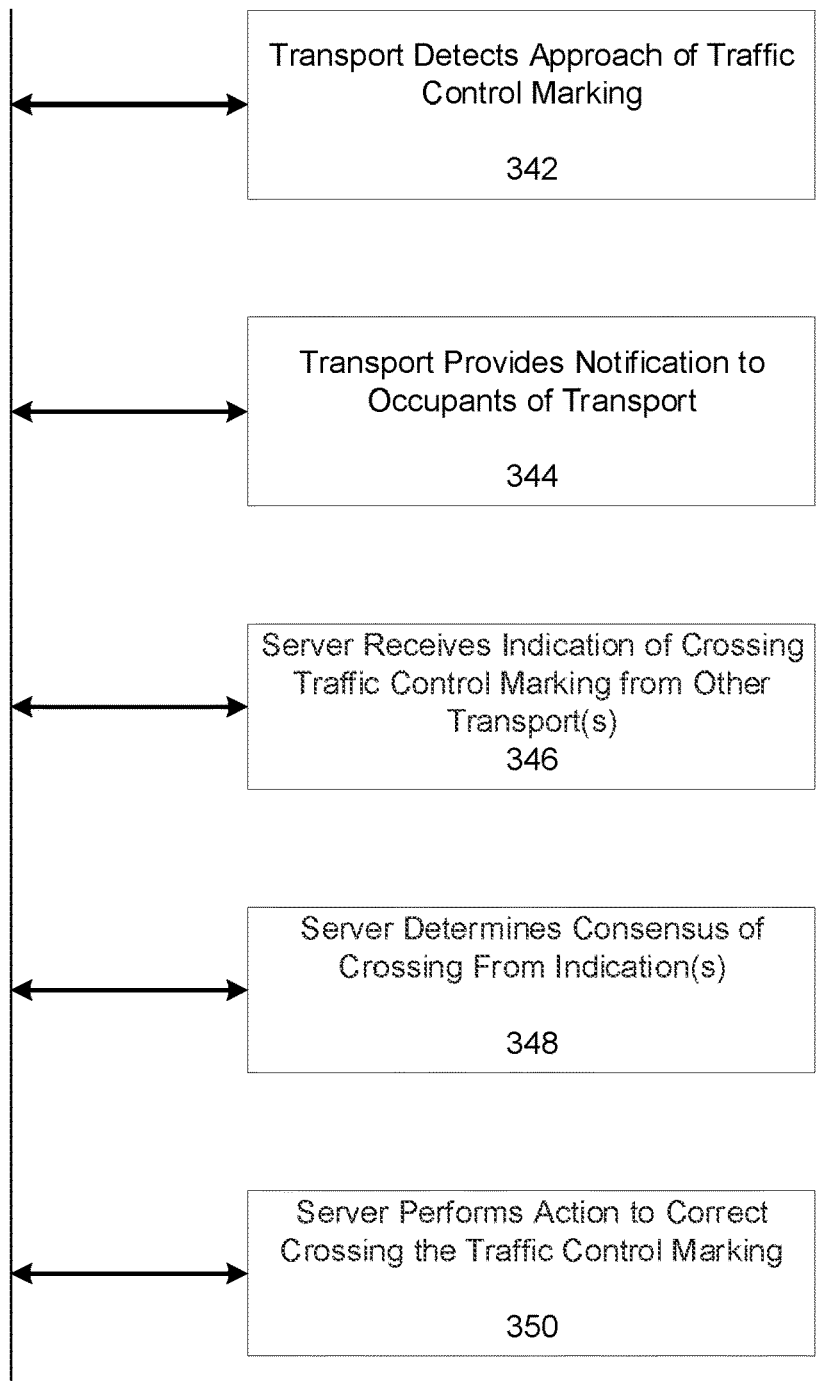
FIG. 3C illustrates yet another flow diagram, according to example embodiments.

FIG. 3C illustrates yet another flow diagram 340, according to example embodiments. Referring to FIG. 3C, the flow begins at block 342. At block 342, a transport 104 detects it is approaching a traffic control marking 172. At block 344, the transport 104 provides a notification to one or more occupants of the transport 104. At block 346, a server 112 receives an indication that the transport 104 has crossed the traffic control marking 172 from one or more other transports 156. At block 348, the server 112 determines a consensus of crossing the traffic control markings 172 from the indication. Finally, in block 350, the server 112 performs one or more actions to correct crossing the traffic control marking 172.

Figure 3D:
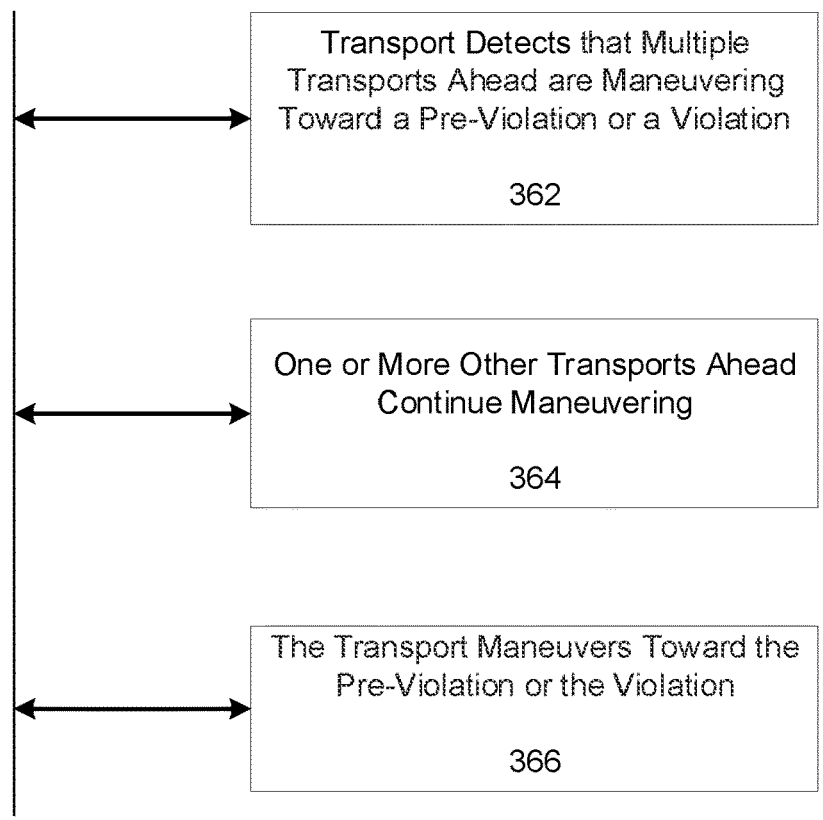
FIG. 3D illustrates yet another flow diagram, according to example embodiments.

FIG. 3D illustrates yet another flow diagram 360, according to example embodiments. Referring to FIG. 3D, the flow begins at block 362. At block 362, a transport 104 detects that multiple transports 156 ahead are maneuvering toward a pre-violation or a violation 194. Detecting may include the more than one other transports 156 are proceeding in a same direction as the violation, or oncoming traffic is stopped. At block 364, one or more other transports 156 ahead continue maneuvering. Continuing maneuvering by the more than one other transports 156 ahead may include one or more of slowing down of the more than one other transports 156, a person directing traffic flow, and one or more traffic signs authorizing a violation. At block 366, the transport 104 maneuvers toward the pre-violation or the violation 194.

Figure 4:
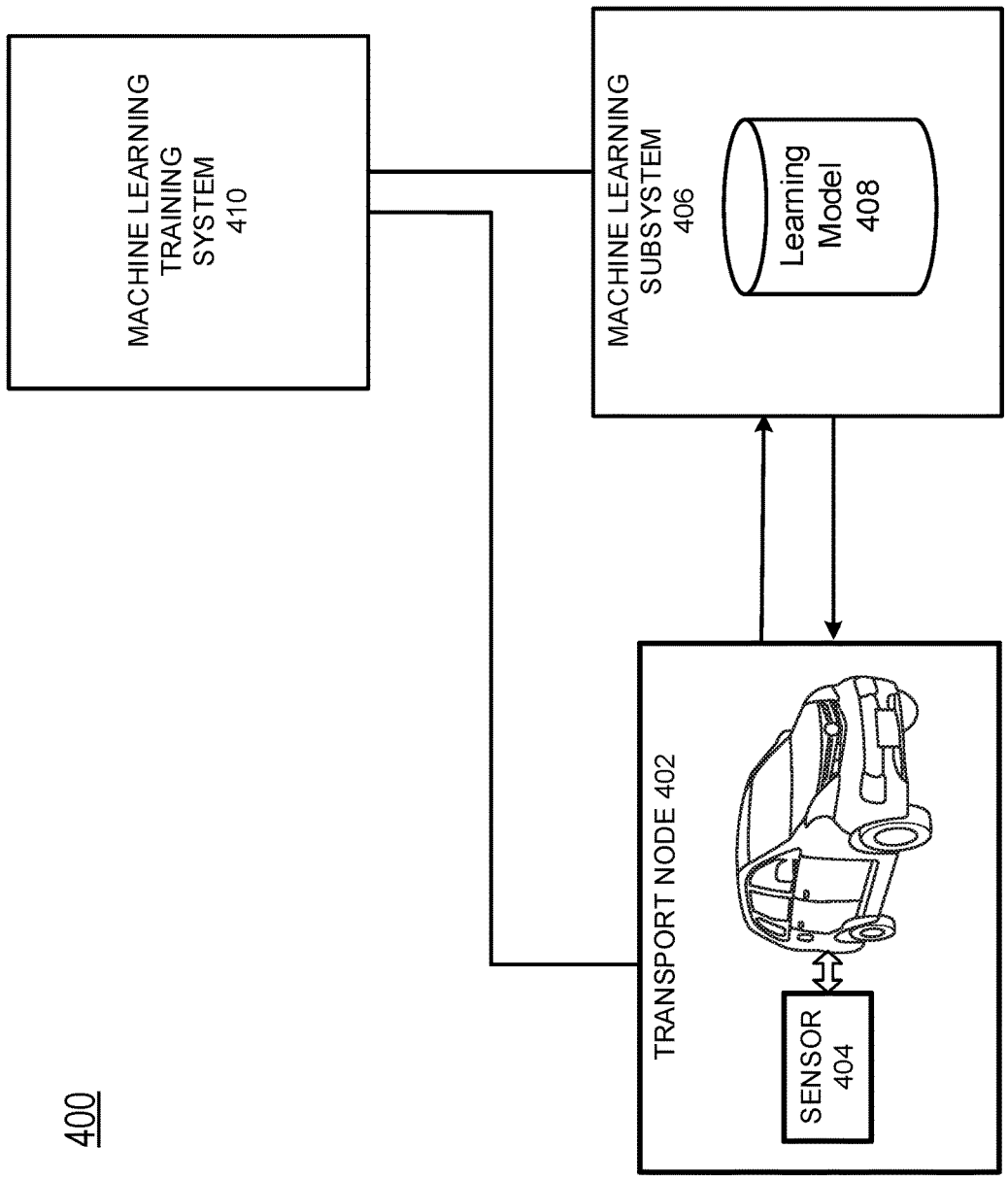
FIG. 4 illustrates a machine learning transport network diagram, according to example embodiments.

FIG. 4 illustrates a machine learning transport network diagram 400, according to example embodiments. The network 400 includes a transport node 402 that interfaces with a machine learning subsystem 406. The transport node includes one or more sensors 404.

The machine learning subsystem 406 contains a learning model 408 which is a mathematical artifact created by a machine learning training system 410 that generates predictions by finding patterns in one or more training data sets. In some embodiments, the machine learning subsystem 406 resides in the transport node 402. In other embodiments, the machine learning subsystem 406 resides outside of the transport node 402.

The transport node 402 sends data from the one or more sensors 404 to the machine learning subsystem 406. The machine learning subsystem 406 provides the one or more sensor 404 data to the learning model 408 which returns one or more predictions. The machine learning subsystem 406 sends one or more instructions to the transport node 402 based on the predictions from the learning model 408.

In a further embodiment, the transport node 402 may send the one or more sensor 404 data to the machine learning training system 410. In yet another embodiment, the machine learning subsystem 406 may sent the sensor 404 data to the machine learning subsystem 410. One or more of the applications, features, steps, solutions, etc., described and/or depicted herein may utilize the machine learning network 400 as described herein.

Figure 5A:
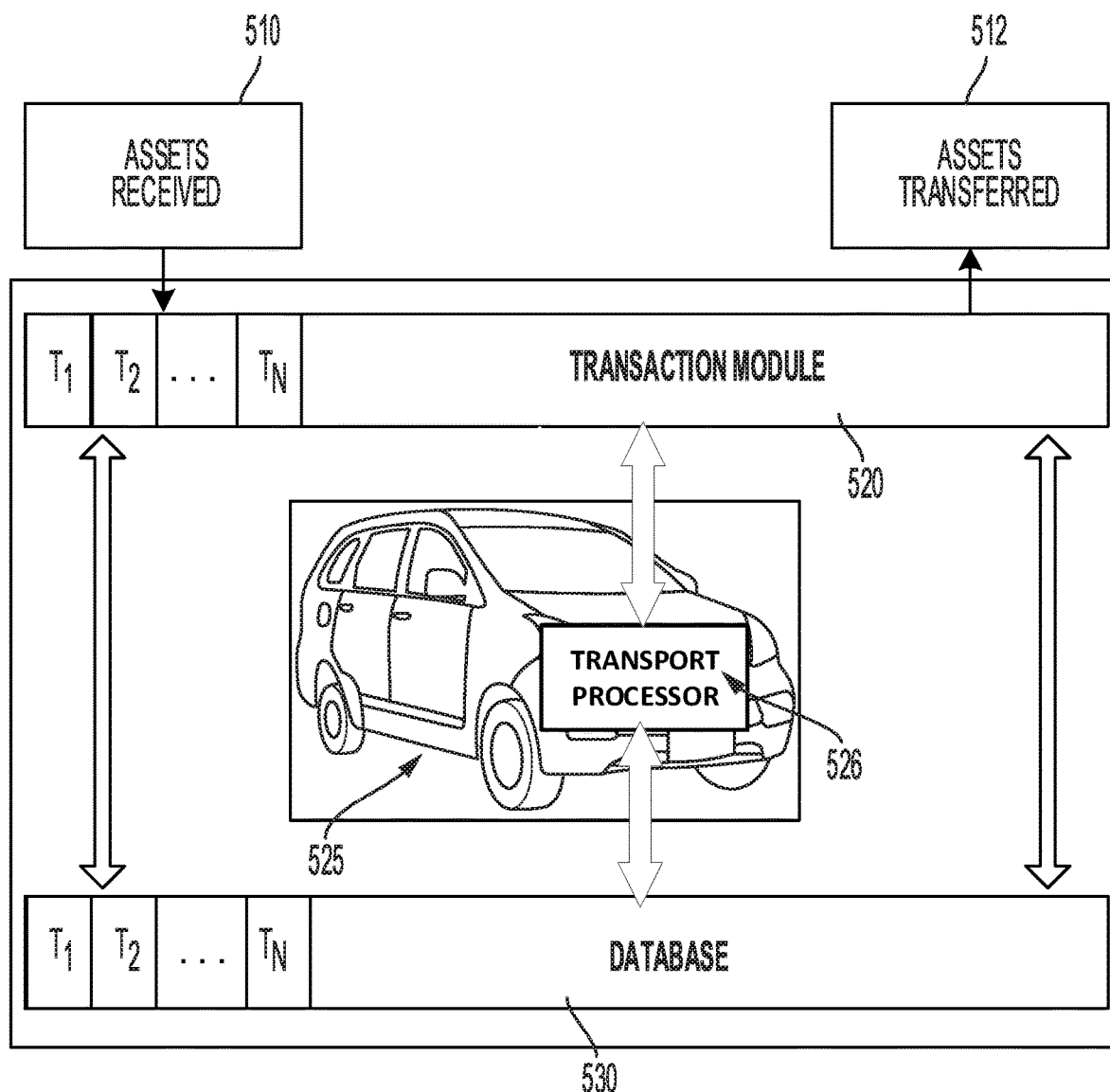
FIG. 5A illustrates an example vehicle configuration for managing database transactions associated with a vehicle, according to example embodiments.

FIG. 5A illustrates an example vehicle configuration 500 for managing database transactions associated with a vehicle, according to example embodiments. Referring to FIG. 5A, as a particular transport/vehicle 525 is engaged in transactions (e.g., vehicle service, dealer transactions, delivery/pickup, transportation services, etc.), the vehicle may receive assets 510 and/or expel/transfer assets 512 according to a transaction(s). A transport processor 526 resides in the vehicle 525 and communication exists between the transport processor 526, a database 530, a transport processor 526 and the transaction module 520. The transaction module 520 may record information, such as assets, parties, credits, service descriptions, date, time, location, results, notifications, unexpected events, etc. Those transactions in the transaction module 520 may be replicated into a database 530. The database 530 can be one of a SQL database, an RDBMS, a relational database, a non-relational database, a blockchain, a distributed ledger, and may be on board the transport, may be off board the transport, may be accessible directly and/or through a network, or be accessible to the transport.

Figure 5B:
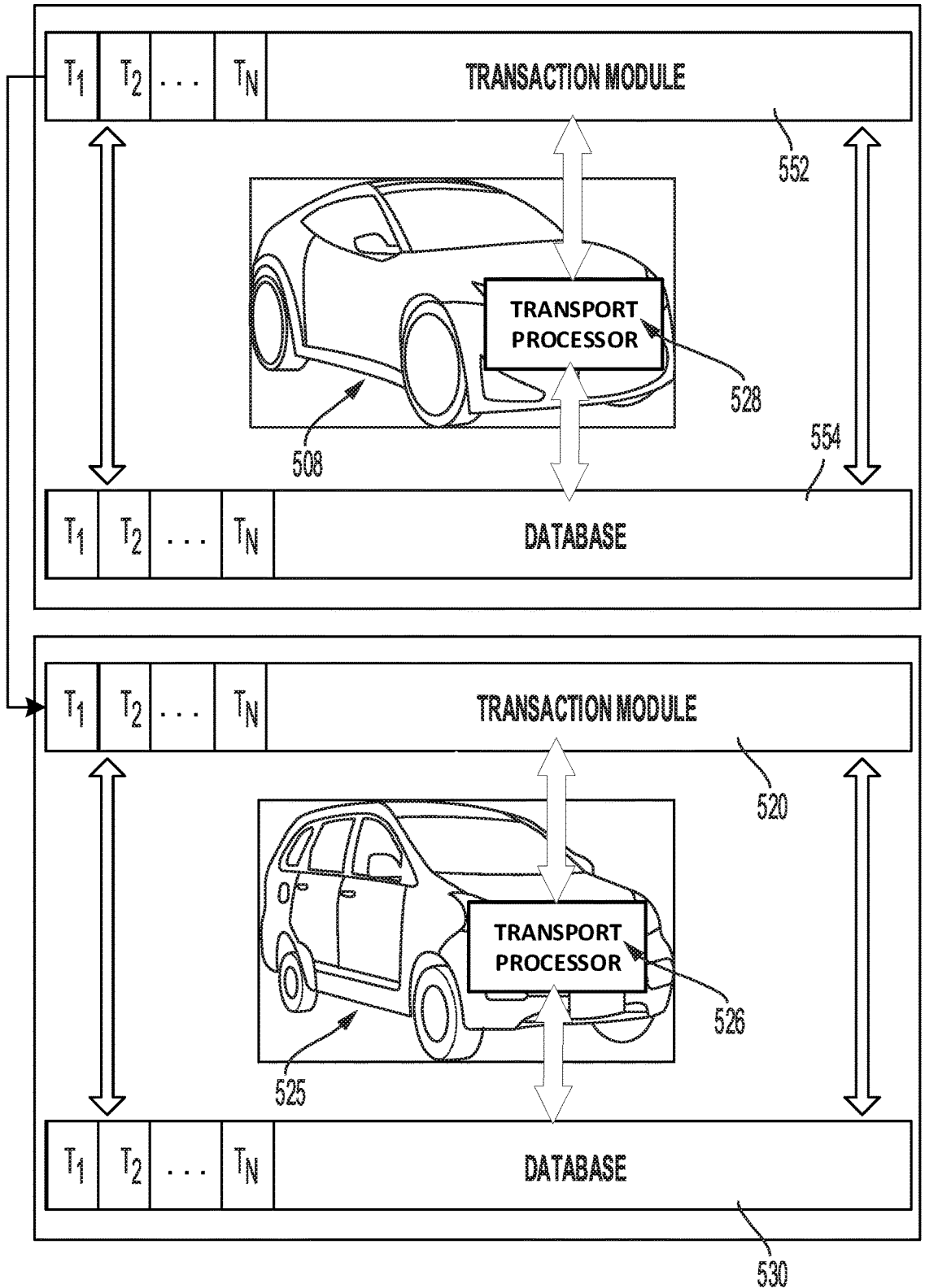
FIG. 5B illustrates another example vehicle configuration for managing database transactions conducted among various vehicles, according to example embodiments.

FIG. 5B illustrates an example vehicle configuration 550 for managing database transactions conducted among various vehicles, according to example embodiments. The vehicle 525 may engage with another vehicle 508 to perform various actions such as to share, transfer, acquire service calls, etc. when the vehicle has reached a status where the services need to be shared with another vehicle. For example, the vehicle 508 may be due for a battery charge and/or may have an issue with a tire and may be in route to pick up a package for delivery. A transport processor 528 resides in the vehicle 508 and communication exists between the transport processor 528, a database 554, a transport processor 528 and the transaction module 552. The vehicle 508 may notify another vehicle 525 which is in its network and which operates on its blockchain member service. A transport processor 526 resides in the vehicle 525 and communication exists between the transport processor 526, a database 530, the transport processor 526 and a transaction module 520. The vehicle 525 may then receive the information via a wireless communication request to perform the package pickup from the vehicle 508 and/or from a server (not shown). The transactions are logged in the transaction modules 552 and 520 of both vehicles. The credits are transferred from vehicle 508 to vehicle 525 and the record of the transferred service is logged in the database 530/554 assuming that the blockchains are different from one another, or, are logged in the same blockchain used by all members. The database 554 can be one of a SQL database, an RDBMS, a relational database, a non-relational database, a blockchain, a distributed ledger, and may be on board the transport, may be off board the transport, may be accessible directly and/or through a network.

Figure 6A:
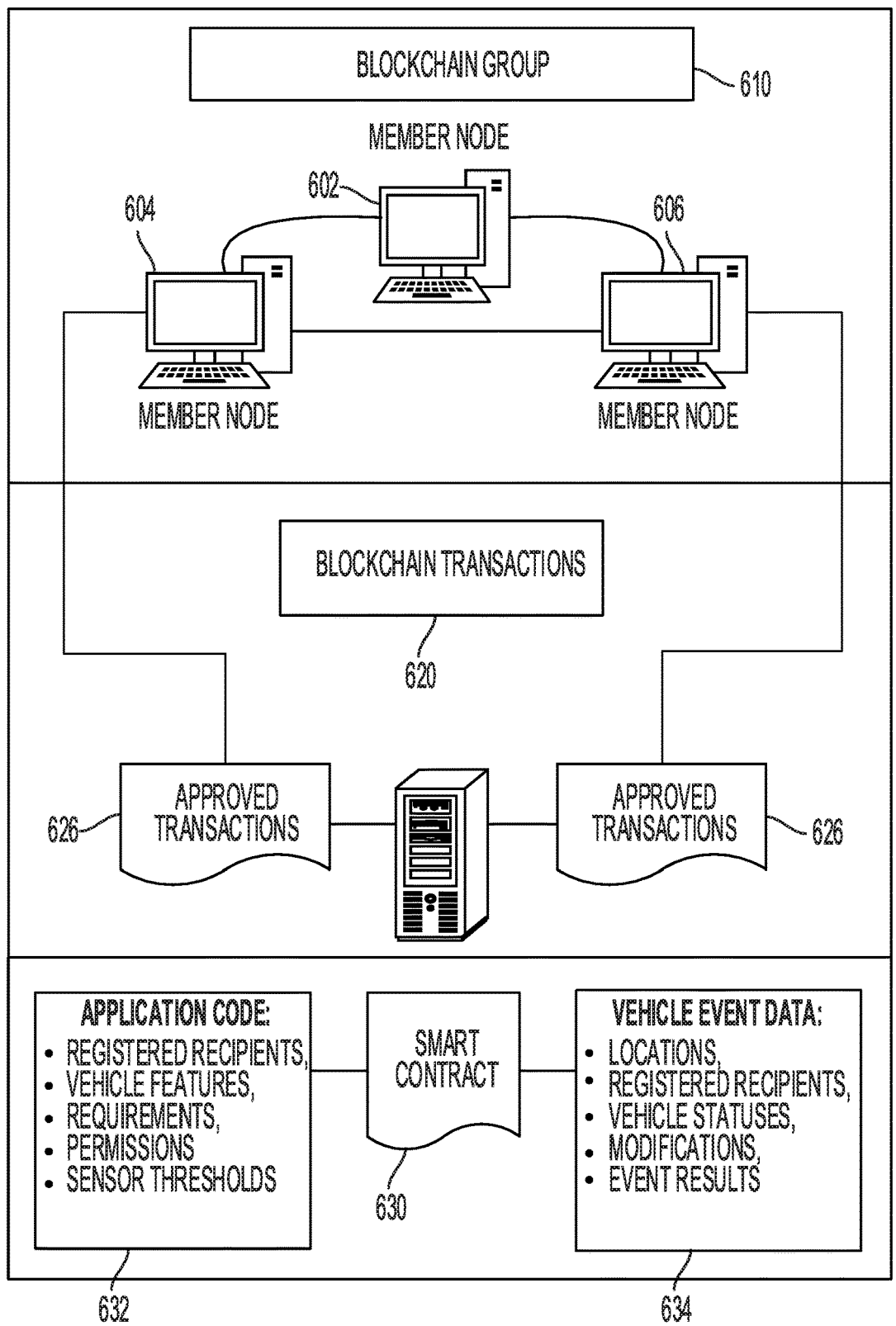
FIG. 6A illustrates a blockchain architecture configuration, according to example embodiments.

FIG. 6A illustrates a blockchain architecture configuration 600, according to example embodiments. Referring to FIG. 6A, the blockchain architecture 600 may include certain blockchain elements, for example, a group of blockchain member nodes 602-606 as part of a blockchain group 610. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 620 are stored in memory of computers as the transactions are received and approved by the consensus model dictated by the members' nodes. Approved transactions 626 are stored in current blocks of the blockchain and committed to the blockchain via a committal procedure which includes performing a hash of the data contents of the transactions in a current block and referencing a previous hash of a previous block. Within the blockchain, one or more smart contracts 630 may exist that define the terms of transaction agreements and actions included in smart contract executable application code 632, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time, then the result may be a change to a current status which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 634, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 630, which are then stored in a blockchain. For example, sensor thresholds stored in the smart contract can be used as the basis for whether a detected service is necessary and when and where the service should be performed.

Figure 6B:
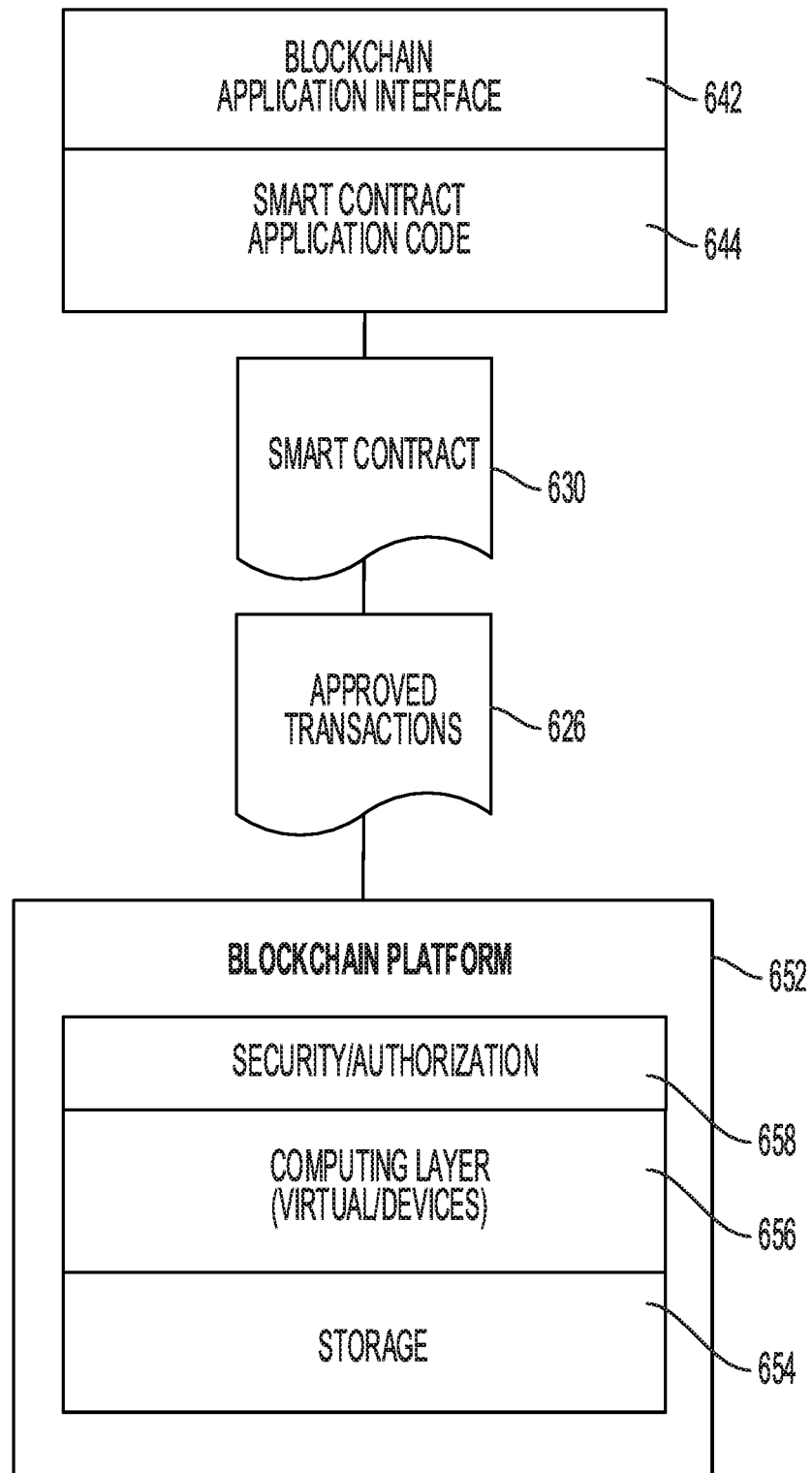
FIG. 6B illustrates another blockchain configuration, according to example embodiments.

FIG. 6B illustrates a shared ledger configuration, according to example embodiments. Referring to FIG. 6B, the blockchain logic example 640 includes a blockchain application interface 642 as an API or plug-in application that links to the computing device and execution platform for a particular transaction. The blockchain configuration 640 may include one or more applications which are linked to application programming interfaces (APIs) to access and execute stored program/application code (e.g., smart contract executable code, smart contracts, etc.) which can be created according to a customized configuration sought by participants and can maintain their own state, control their own assets, and receive external information. This can be deployed as an entry and installed, via appending to the distributed ledger, on all blockchain nodes.

The smart contract application code 644 provides a basis for the blockchain transactions by establishing application code which when executed causes the transaction terms and conditions to become active. The smart contract 630, when executed, causes certain approved transactions 626 to be generated, which are then forwarded to the blockchain platform 652. The platform includes a security/authorization 658, computing devices, which execute the transaction management 656 and a storage portion 654 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 6A and 6B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code which is registered, stored, and/or replicated with a blockchain (e.g., distributed network of blockchain peers). An entry is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 6C:
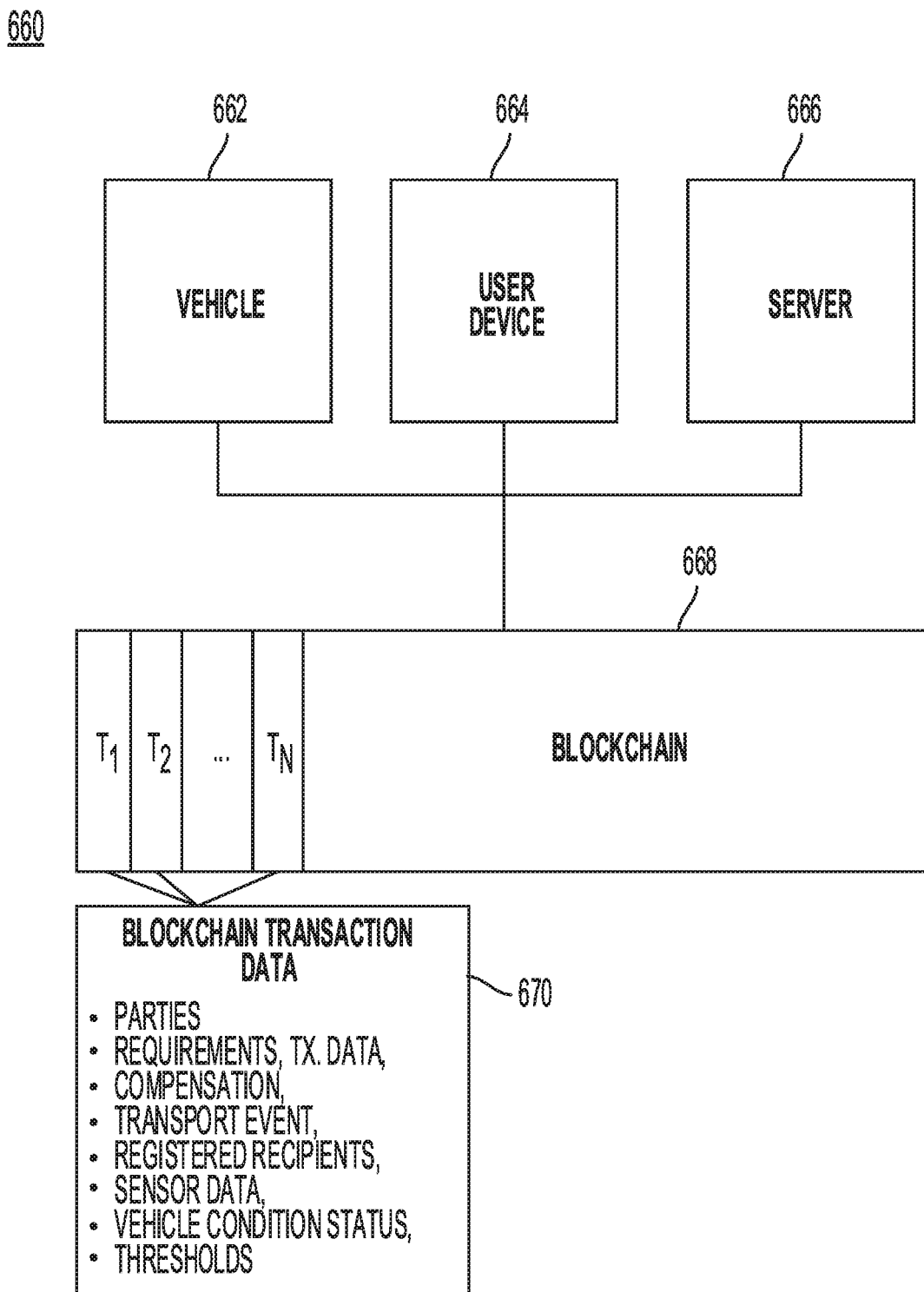
FIG. 6C illustrates a blockchain configuration for storing blockchain transaction data, according to example embodiments.

FIG. 6C illustrates a blockchain configuration for storing blockchain transaction data, according to example embodiments. Referring to FIG. 6C, the example configuration 660 provides for the vehicle 662, the user device 664 and a server 666 sharing information with a distributed ledger (i.e., blockchain) 668. The server may represent a service provider entity inquiring with a vehicle service provider to share user profile rating information in the event that a known and established user profile is attempting to rent a vehicle with an established rated profile. The server 666 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 670 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 6D:
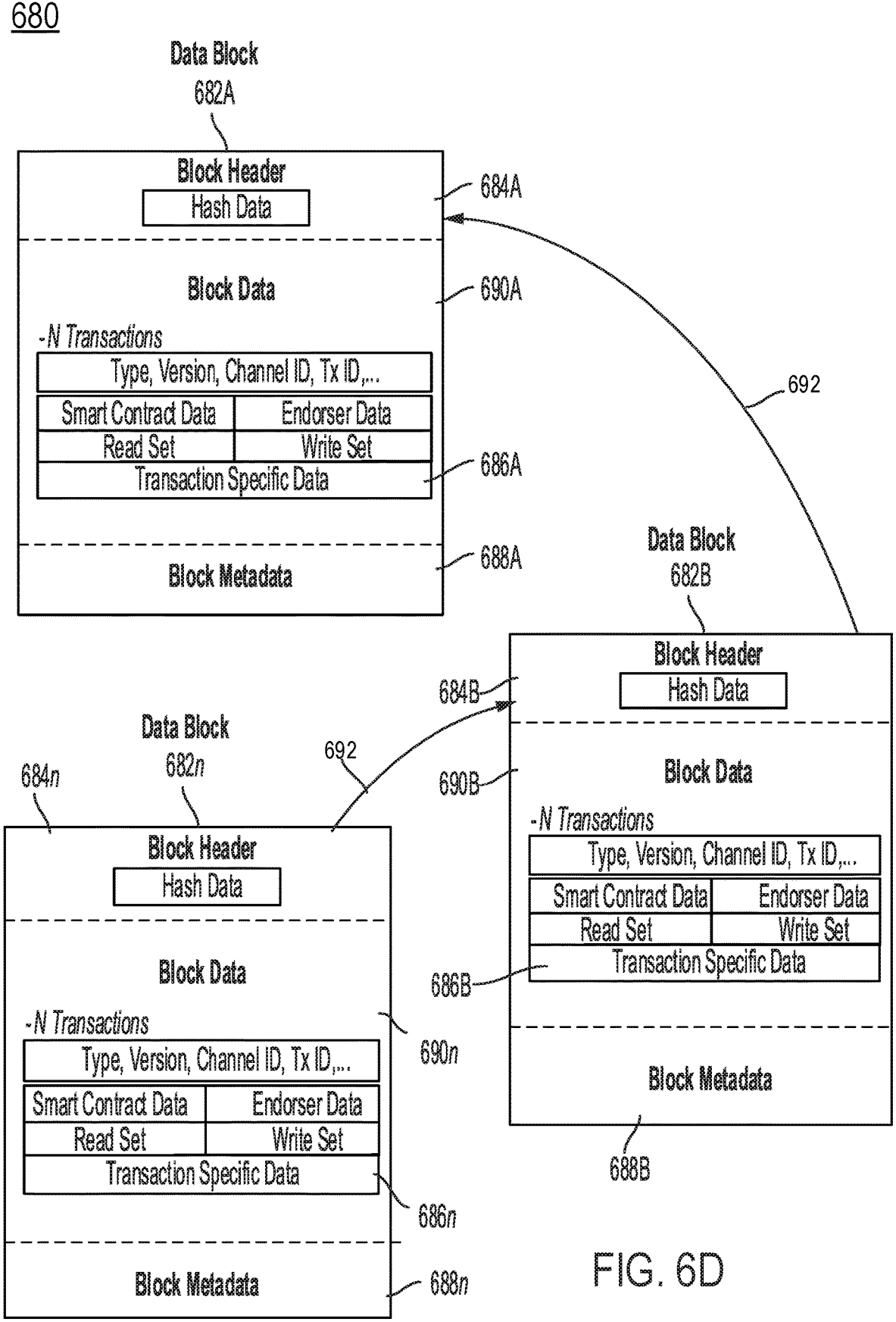
FIG. 6D illustrates example data blocks, according to example embodiments.

FIG. 6D illustrates blockchain blocks 680 that can be added to a distributed ledger, according to example embodiments, and contents of block structures 682A to 682n. Referring to FIG. 6D, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain which stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 6D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts which simulate the entry proposals. When an endorsing node endorses an entry, the endorsing nodes creates an entry endorsement which is a signed response from the endorsing node to the client application indicating the endorsement of the simulated entry. The method of endorsing an entry depends on an endorsement policy which may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 682A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 6D, a block 682A (also referred to as a data block) that is stored on the blockchain and/or the distributed ledger may include multiple data segments such as a block header 684A to 684n, transaction specific data 686A to 686n, and block metadata 688A to 688n. It should be appreciated that the various depicted blocks and their contents, such as block 682A and its contents are merely for purposes of an example and are not meant to limit the scope of the example embodiments. In some cases, both the block header 684A and the block metadata 688A may be smaller than the transaction specific data 686A which stores entry data; however, this is not a requirement. The block 682A may store transactional information of N entries (e.g., 100, 500, 1000, 2000, 3000, etc.) within the block data 690A to 690n. The block 682A may also include a link to a previous block (e.g., on the blockchain) within the block header 684A. In particular, the block header 684A may include a hash of a previous block's header. The block header 684A may also include a unique block number, a hash of the block data 690A of the current block 682A, and the like. The block number of the block 682A may be unique and assigned in an incremental/sequential order starting from zero. The first block in the blockchain may be referred to as a genesis block which includes information about the blockchain, its members, the data stored therein, etc.

The block data 690A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 690A may also store transaction specific data 686A which adds additional information to the hash-linked chain of blocks in the blockchain. Accordingly, the data 686A can be stored in an immutable log of blocks on the distributed ledger. Some of the benefits of storing such data 686A are reflected in the various embodiments disclosed and depicted herein. The block metadata 688A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 690A and a validation code identifying whether an entry was valid/invalid.

The other blocks 682B to 682n in the blockchain also have headers, files, and values. However, unlike the first block 682A, each of the headers 684A to 684n in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 692, to establish an auditable and immutable chain-of-custody.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
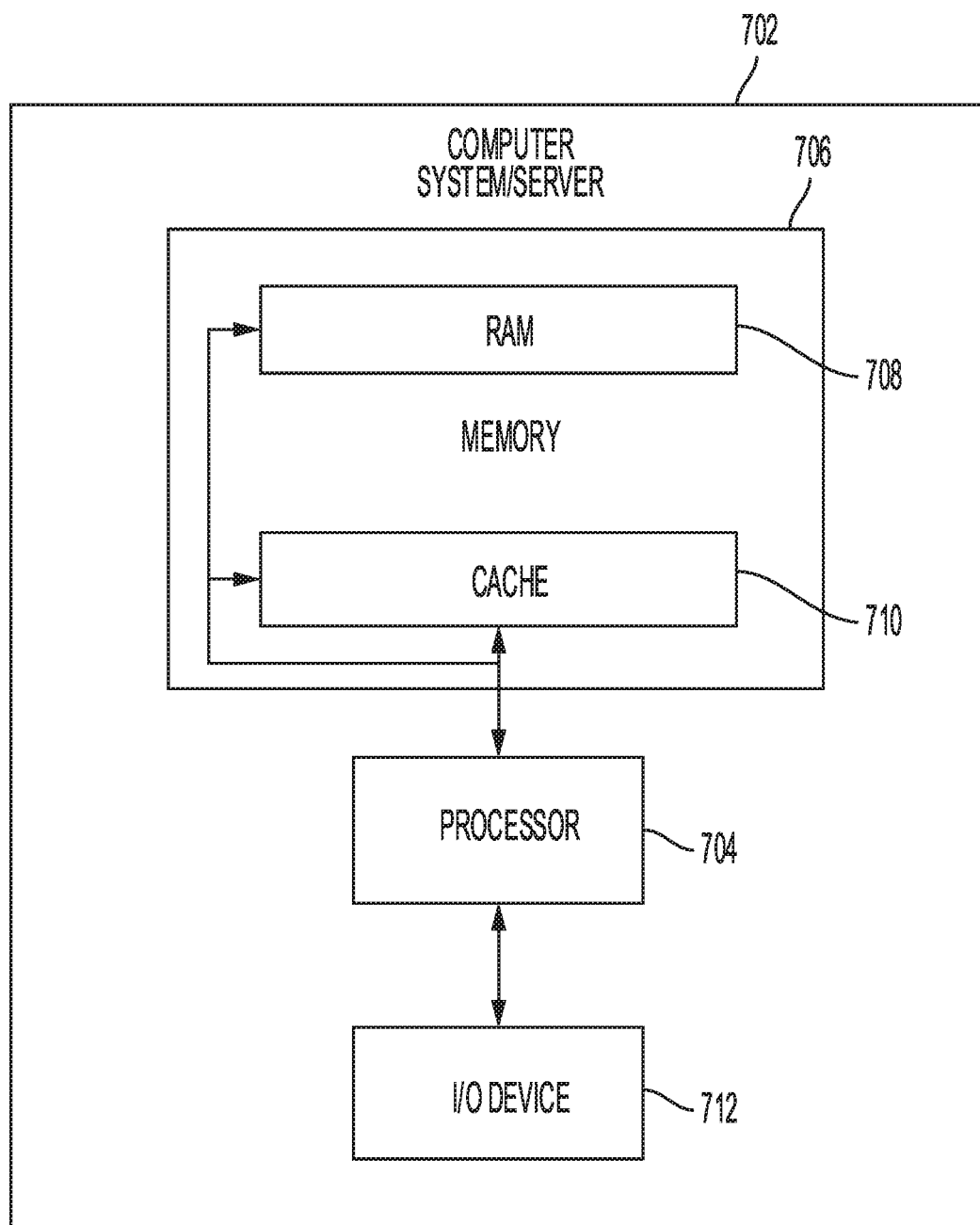
FIG. 7 illustrates an example system that supports one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 708 and/or cache memory 710. Computer system/server 702 may further include other removable/non-removable, volatile/non-volatile computer system storage media. By way of example only, memory 706 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via an I/O device 712 (such as an I/O adapter), which may include a keyboard, a pointing device, a display, a voice recognition module, etc., one or more devices that enable a user to interact with computer system/server 702, and/or any devices (e.g., network card, modem, etc.) that enable computer system/server 702 to communicate with one or more other computing devices. Such communication can occur via I/O interfaces of the device 712. Still yet, computer system/server 702 can communicate with one or more networks such as a local area network (LAN), a general wide area network (WAN), and/or a public network (e.g., the Internet) via a network adapter. As depicted, device 712 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   initially determining, via one or more sensors on a transport, that the transport is approaching a one-way road in a wrong direction based on a slowing down of the transport and a movement of the transport toward the one-way road;
   notifying, one or more sensors, one or more occupants of the transport about the approaching; and
   in response to the transport continuing to approach in the wrong direction, slowing the transport, by a computer associated with the transport, to not permit entry into the one-way road, wherein the computer will stop the transport when no response is g by the one or more occupants while the transport is approaching the one-way road in the wrong direction;
   wherein the transport determines a speed, a position, and a direction of one or more other transports on a collision path with the transport.

2. The method of claim 1, comprising, in response to the one or more other transports are within a distance from the transport defined by a geofence,
   notifying, via the transport, the one or more other transports of the speed, position, and direction of the transport.

3. The method of claim 1, comprising in response to the transport entering the one-way road, stopping the transport, by the computer, and performing one or more of:
   reversing the transport; and
   turning around the transport.

4. The method of claim 1, comprising in response to slowing the transport,
   invoking, by the computer, one or more functions comprising hazard lights, flashers, and a horn sounding.

5. The method of claim 1, comprising in response to the notifying the one or more occupants,
   waiting for a response from the one or more occupants; and
   when no response is received from the one or more occupants within a time period,
   notifying one or more appropriate first responders.

6. The method of claim 1, wherein the notifying the one or more occupants comprises:
   providing one or more of a visual map and voice instructions to exit the one-way road.

7. A transport, comprising:
   a processor; and
   a memory, coupled to the processor, comprising instructions that when executed by the processor are configured to:
      initially determine, via one or more sensors on a transport, that the transport approaches a one-way road in a wrong direction based on the transport slows down and a movement of the transport toward the one-way road;
      notify, via the one or more sensors, one or more occupants of the transport about the transport approaches the one-way road in the wrong direction; and
      in response to the transport continues to approach the one-way road in the wrong direction, a computer associated with the transport is configured to slow the transport to permit entry into the one-way road, wherein the computer will stop the transport when no response is given by the one or more occupants while the transport is approaching the one-way road in the wrong direction;
      wherein the transport determines a speed, a position, and a direction of one or more other transports on a collision path with the transport.

8. The transport of claim 7, wherein the one or more other transports are within a distance from the transport defined by a boundary, wherein the processor is further configured to:
   notify, via the transport, the one or more other transports of the speed, position, and direction of the transport.

9. The transport of claim 7, wherein in response to the transport enters the one-way road, the computer is configured to stop the transport and one or more of:
   reverse the transport; and
   turn around the transport.

10. The transport of claim 7, wherein in response to the computer slows the transport, the computer is further configured to:
   invoke one or more functions comprising hazard lights, flashers, and a horn.

11. The transport of claim 7, wherein in response to the notification of the one or more occupants, the processor is further configured to:
   wait for a response from the one or more occupants; and
   when no response is received from the one or more occupants within a time period, notify one or more appropriate first responders.

12. The transport of claim 7, wherein the processor is configured to notify the one or more occupants comprises the processor further configured to:
   provide one or more of a visual map and voice instructions to exit the one-way road.

13. A non-transitory computer readable medium comprising instructions, that when read by a processor, cause the processor to perform:
   initially determining, via one or more sensors on a transport, that the transport is approaching a one-way road in a wrong direction based on a slowing down of the transport and a movement of the transport toward the one-way road;

notifying, via the one or more sensors, one or more occupants of the transport about the approaching; and in response to the transport continuing to approach in the wrong direction slowing the transport, by a computer associated with the transport, to not permit entry into the one-way road, wherein the computer will stop the transport when no response is given by the one or more occupants while the transport approaching the one-way road in the wrong direction;

wherein the transport determines a speed, a position, and a direction of one or more other transports a collision path with the transport.

14. The non-transitory computer readable medium of claim 13, wherein the one or more other transports are within a distance from the transport defined by a geofence, wherein the instructions cause the processor to further perform:

notifying, via the transport, one or more other transports of the speed, position, and direction of the transport.

15. The non-transitory computer readable medium of claim 13, wherein in response to the transport is entering the one-way road, stopping the transport, by the computer, and performs one or more of:

reversing the transport; and turning around the transport.

16. The non-transitory computer readable medium of claim 13, wherein in response to slowing the transport, the instructions cause the processor to further perform:

invoking one or more functions comprising hazard lights, flashers, and a horn.

17. The non-transitory computer readable medium of claim 13, wherein in response to the notifying the one or more occupants, the instructions cause the processor to further perform:

waiting for a response from the one or more occupants; and when no response is received from the one or more occupants within a time period, notifying one or more appropriate first responders.

18. The non-transitory computer readable medium of claim 13, wherein in response to the notifying the one or more occupants, the instructions cause the processor to further perform:

providing one or more of a visual map and voice instructions to exit the one-way road.

* * * * *